CHANGE MAKING DEVICE

INVENTORS.
OTTO A. HOKANSON.
RICHARD C. JONES.
BY Lockwood, Goldsmith & Galt,
ATTORNEYS.

Oct. 24, 1950 O. A. HOKANSON ET AL 2,526,749

CHANGE MAKING DEVICE

Original Filed July 28, 1944 15 Sheets-Sheet 2

INVENTORS.
OTTO A. HOKANSON.
RICHARD C. JONES.

BY Lockwood, Goldsmith & Galt.
ATTORNEYS.

CHANGE MAKING DEVICE

INVENTORS.
OTTO A. HOKANSON.
RICHARD C. JONES.
BY
Lockwood, Goldsmith & Galt.
ATTORNEYS.

CHANGE MAKING DEVICE

Original Filed July 28, 1944 15 Sheets-Sheet 4

INVENTORS.
OTTO A. HOKANSON,
RICHARD C. JONES.

BY Lockwood, Goldsmith & Galt,
ATTORNEYS.

INVENTORS.
OTTO A. HOKANSON.
RICHARD C. JONES.
BY
Lockwood, Goldsmith & Galt.
ATTORNEYS.

CHANGE MAKING DEVICE

Original Filed July 28, 1944 15 Sheets-Sheet 6

INVENTORS.
OTTO A. HOKANSON.
RICHARD C. JONES.
BY
Lockwood, Goldsmith & Galt,
ATTORNEYS.

Oct. 24, 1950 O. A. HOKANSON ET AL 2,526,749
CHANGE MAKING DEVICE
Original Filed July 28, 1944 15 Sheets-Sheet 7
FIG. 14.
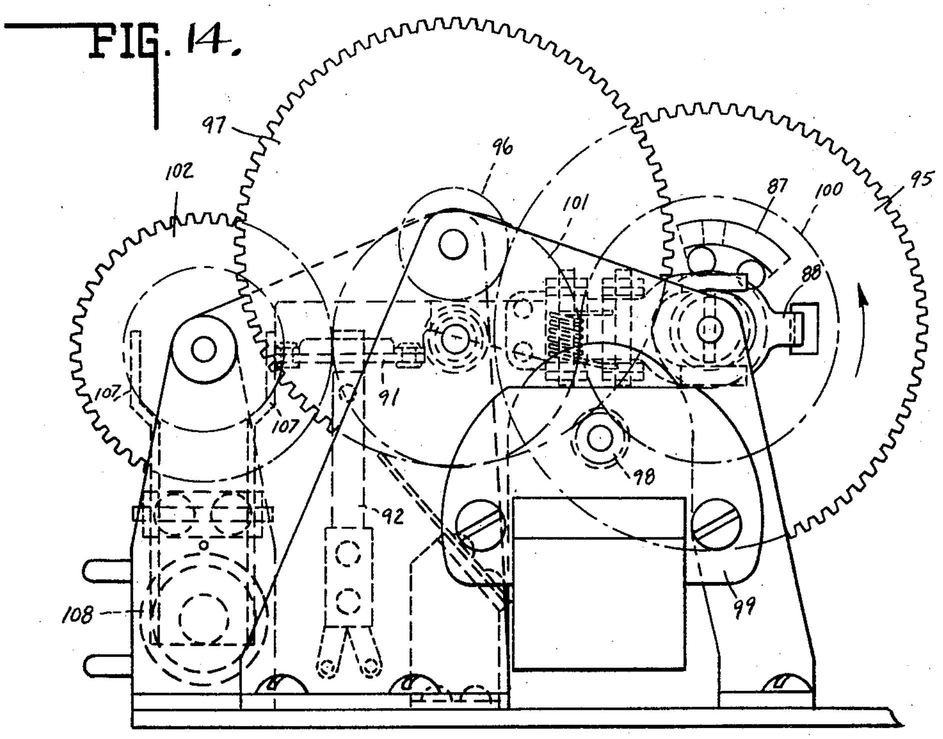
FIG. 24 FIG. 25
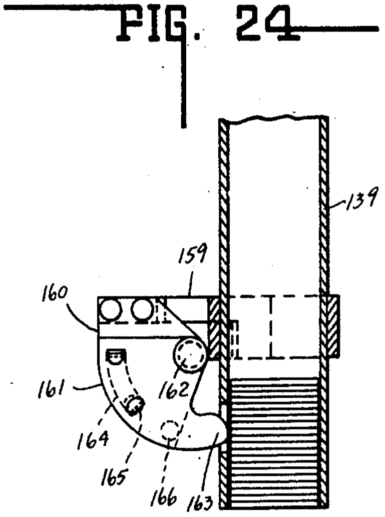
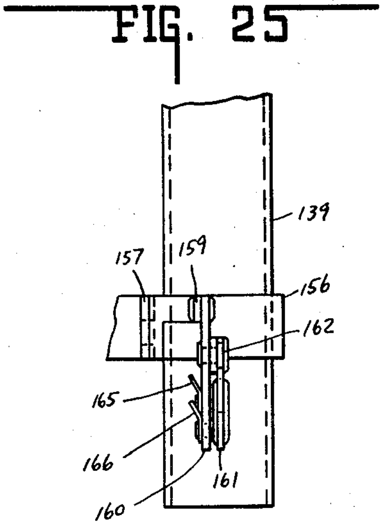
INVENTORS.
OTTO A. HOKANSON.
RICHARD C. JONES,
BY
ATTORNEYS.

Oct. 24, 1950 O. A. HOKANSON ET AL 2,526,749

CHANGE MAKING DEVICE

Original Filed July 28, 1944 15 Sheets-Sheet 8

INVENTORS.
OTTO A. HOKANSON.
RICHARD C. JONES.
BY
Lockwood, Goldsmith & Galt.
ATTORNEYS.

CHANGE MAKING DEVICE

Original Filed July 28, 1944 15 Sheets-Sheet 9

INVENTORS.
OTTO A. HOKANSON.
RICHARD C. JONES.
BY
Lockwood, Goldsmith & Galt.
ATTORNEYS.

Oct. 24, 1950 O. A. HOKANSON ET AL 2,526,749

CHANGE MAKING DEVICE

Original Filed July 28, 1944 15 Sheets-Sheet 10

INVENTORS.
OTTO A. HOKANSON.
RICHARD C. JONES.

BY Lockwood, Goldsmith & Galt.
ATTORNEYS.

CHANGE MAKING DEVICE

Original Filed July 28, 1944 15 Sheets-Sheet 11

INVENTORS.
OTTO A. HOKANSON.
RICHARD C. JONES.
BY
Lockwood, Goldsmith & Galt.
ATTORNEYS.

CHANGE MAKING DEVICE

Original Filed July 28, 1944 15 Sheets-Sheet 12

INVENTORS.
OTTO A. HOKANSON.
RICHARD C. JONES.
BY
Lockwood, Goldsmith & Galt,
ATTORNEYS.

Oct. 24, 1950 O. A. HOKANSON ET AL 2,526,749

CHANGE MAKING DEVICE

Original Filed July 28, 1944 15 Sheets-Sheet 13

INVENTORS.
OTTO A. HOKANSON.
RICHARD C. JONES.
BY
Lockwood, Goldsmith & Galt,
ATTORNEYS.

INVENTORS.
OTTO A. HOKANSON.
RICHARD C. JONES.
BY
Lockwood, Goldsmith & Galt.
ATTORNEYS.

INVENTORS.
OTTO A. HOKANSON,
BY RICHARD C. JONES.
Lockwood, Goldsmith & Galt.
ATTORNEYS.

Patented Oct. 24, 1950

2,526,749

UNITED STATES PATENT OFFICE 2,526,749

CHANGE MAKING DEVICE

Otto A. Hokanson, Snyder, and Richard C. Jones, North Tonawanda, N. Y., assignors to The Rudolph Wurlitzer Company, Chicago, Ill., a corporation Original application July 28, 1944, Serial No. 546,964. Divided and this application June 27, 1946, Serial No. 679,678

8 Claims. (Cl. 133—2)

This invention relates to a change making device applicable to the registry of coins and the making of change such as may be applied and used in connection with the vending of merchandise, this application being a division of the application of Otto A. Hokanson and Richard C. Jones, Serial Number 546,964, filed July 28, 1944, and entitled "Multi-Coin Register and Change Maker," now abandoned.

It is recognized that under conditions of changing prices and the changing demand for machine vended merchandise, great advantage may be had in a vending machine which is flexible not only with respect to the price of the article vended, but in respect to different articles to be vended thereby. For example, a vending machine operating to vend cigarettes, chewing gum or candy bars, may be commonly employed where such items are vended at a fixed price, such as Fifteen Cents and Five Cents, respectively. But wherein tax levies or increased costs may require vending such articles profitably at a higher or even a lower price by a few cents, and perhaps depending upon the locality in which it operates, it becomes necessary to provide a machine which will function at prices other than unit nickels, dimes, etc. Thus, it may be necessary in certain localities to vend a package of cigarettes at Sixteen, Seventeen or Eighteen Cents, and to vend chewing gum or candy bars at Six or Seven Cents. Other items which may be profitably vended may involve other and varying prices. It is, therefore, one object of this invention to provide a machine which is flexible to the extent of vending such articles at odd prices which may be varied from time to time as distinguished from the usual practice of vending articles at a price to permit the use of unit coins.

Another desired advantage residing in the invention relates to the provision of a machine which will be flexible in respect to the merchandise vended. Wherein a merchant places a machine at different locations, it may be desirable, depending upon the demand, to withdraw from the machine certain items of slow sale and substitute other items therefor to be vended at the same or different price. In making such change the price may be varied a few cents as between the slow moving articles removed and the articles substituted therefor. It is, therefore, the purpose of this invention to provide a coin register and change maker which will make such a machine possible for the vending of various items, substitution of one item for another and change in prices therefor to the extent of a penny difference. It is further the purpose of this invention to make such a vending machine practical and operable through enabling the customer to deposit a coin of a denomination greater than the price of the article to be vended and receive his change, or perhaps insert a series of coins having an aggregate value greater than the article purchased and receive his change.

Therefore, a further feature of the invention resides in the provision of a coin register which will evaluate the one or more coins deposited, and if the total value of such coin or coins is as great or greater than the price of the article, the article will be dispensed. However, wherein the coin or coins deposited are of an aggregate greater value than the article vended, the appropriate change will be dispensed and returned to the purchaser. For this purpose the change maker mechanism is provided to automatically calculate, separate and dispense the appropriate change in an amount equal to the aggregate value of the coins deposited less the price of the article dispensed.

Such a machine may dispense any number of articles of varying price range, and as herein disclosed the price range may be One Cent up to the maximum of Twenty-Six Cents. However, the price range could easily be extended to Fifty Cents or more within the scope of manipulation by the insertion of coins. The machine herein shown is arranged to accept any coins of the denomination of a quarter or less, i. e., one cent, a nickel, a dime or a quarter, said coins being inserted in a single slot in any sequence. Thus, another feature of the invention resides in provision being made for the sorting of coins of different denominations sequentially deposited and evaluating each of said coins to register their aggregate value.

A further feature resides in the provision of a window showing the amount of change each purchaser is entitled to, if any, after each purchase. The window continues to show the amount of change due the purchaser until the next operation so as to minimize any dispute with respect thereto. The window may show the change paid out, either as a total amount or in the number and denomination of coins, or both.

Also, the invention contemplates the actuation of the machine such as to vend an article selected, and pay out change only after the inserted coins have been tested for slugs, counted and the price of the goods subtracted from the aggregate value of the coins.

A further feature of the invention resides in the provision of mechanism for requesting insertion only of the exact price for the article in event sufficient coins are lacking in the change maker to dispense the proper change.

The full nature of the invention will be understood from the accompanying drawings and the following description and claims:

Fig. 14 is a rear elevation of the power transmitting unit shown in Figs. 11 and 12.

Fig. 24 is a side elevation of the unit for indicating absence of change making coins.

Fig. 25 is an end elevation thereof.

Figure 1:
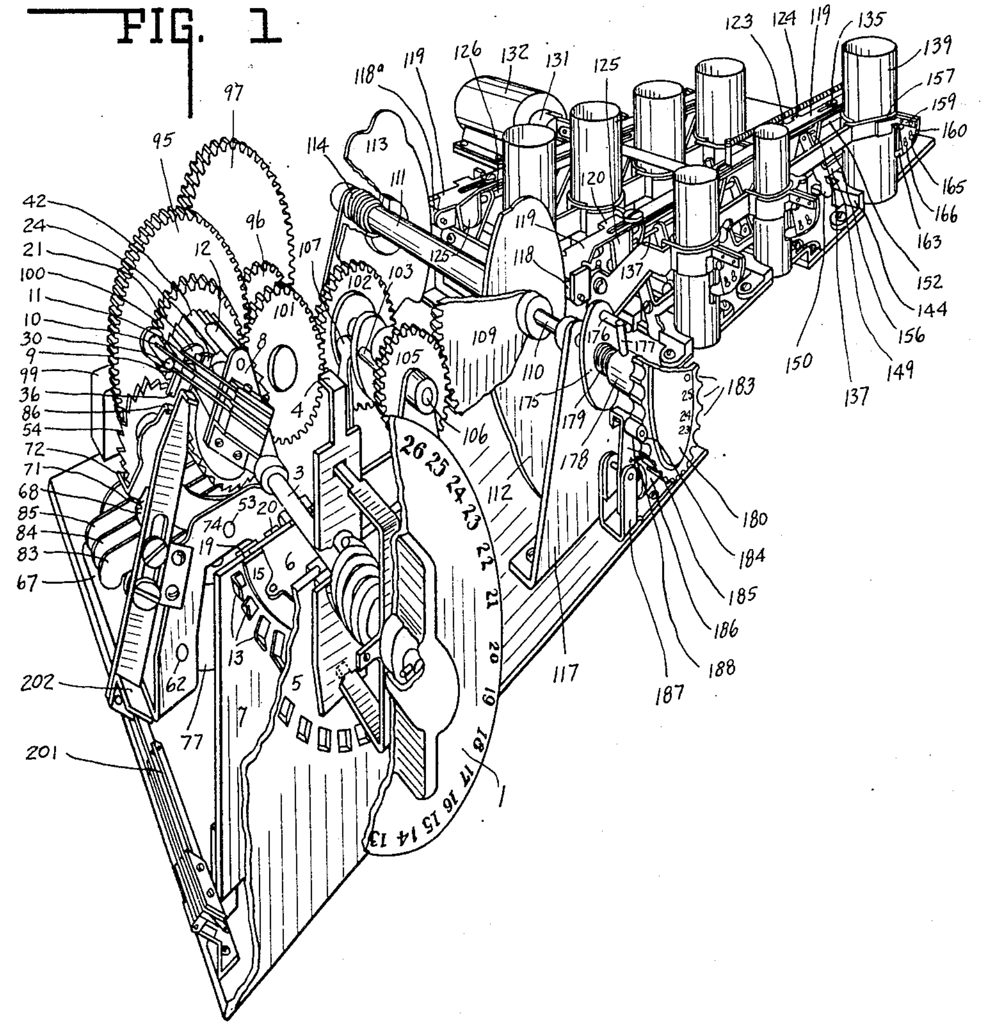
Fig. 1 is a perspective view of the coin register and change maker units for controlling the vending of merchandise and the making of change.
Figure 3:
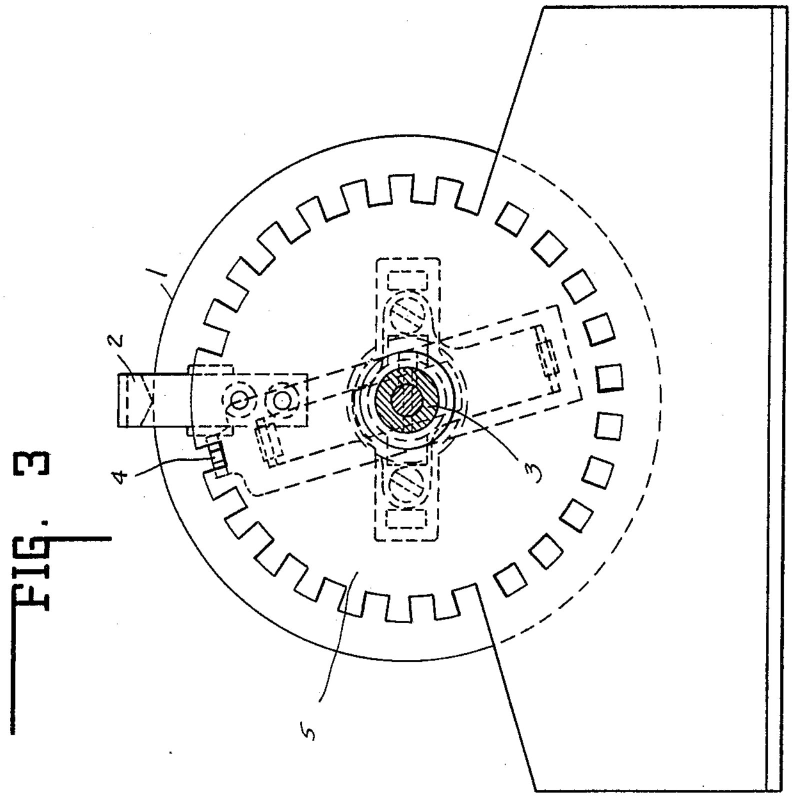
Fig. 3 is a section taken on the line 3—3 of Fig. 2.
Figure 2:
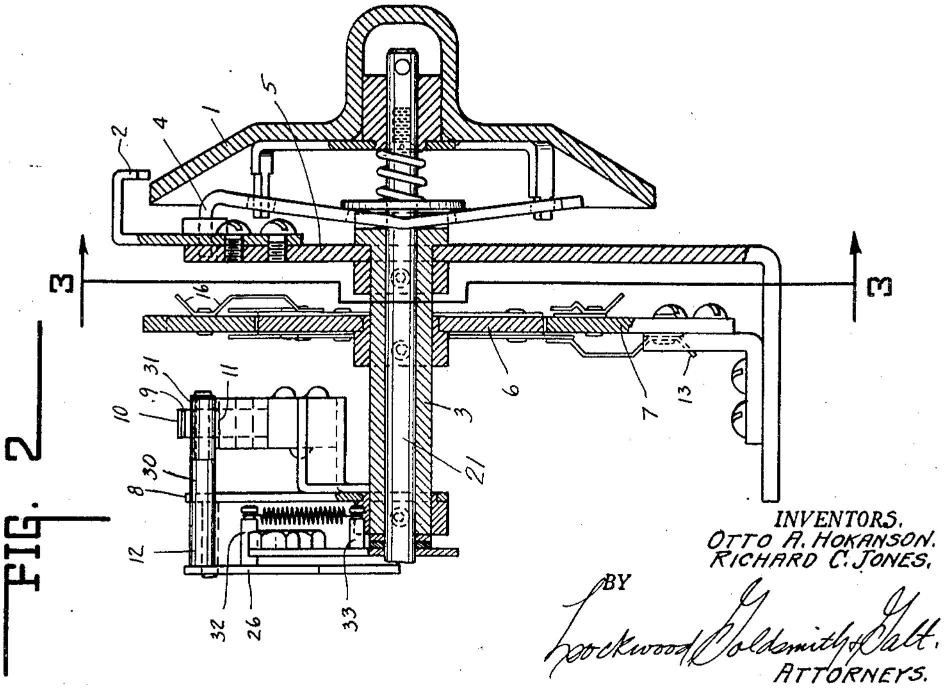
Fig. 2 is a central vertical section through the price setting dial and associated parts.

For illustrating one form and application of the invention there is herein disclosed a change making device in association with a price or value setting dial 1 which is manually revolved to position a value indicated on the face opposite a pointer 2 (Figs. 1, 2, and 3). A sleeve 3 revolves with the dial and is locked in angular position by a latch 4 engaging one of the holes or notches in a panel 5. On the sleeve 3 a rotating switch member 6 is mounted to rotate within a fixed switch plate 7. Also rotatable with said sleeve and secured thereto, there is provided a price arm 8. Said price arm carries a switch including the contact leaves 9, 10, and 11, contact leaf 9 being common to both switches, and contacts 9 and 11 being normally in contact with each other.

Figures 4, 5, 6:
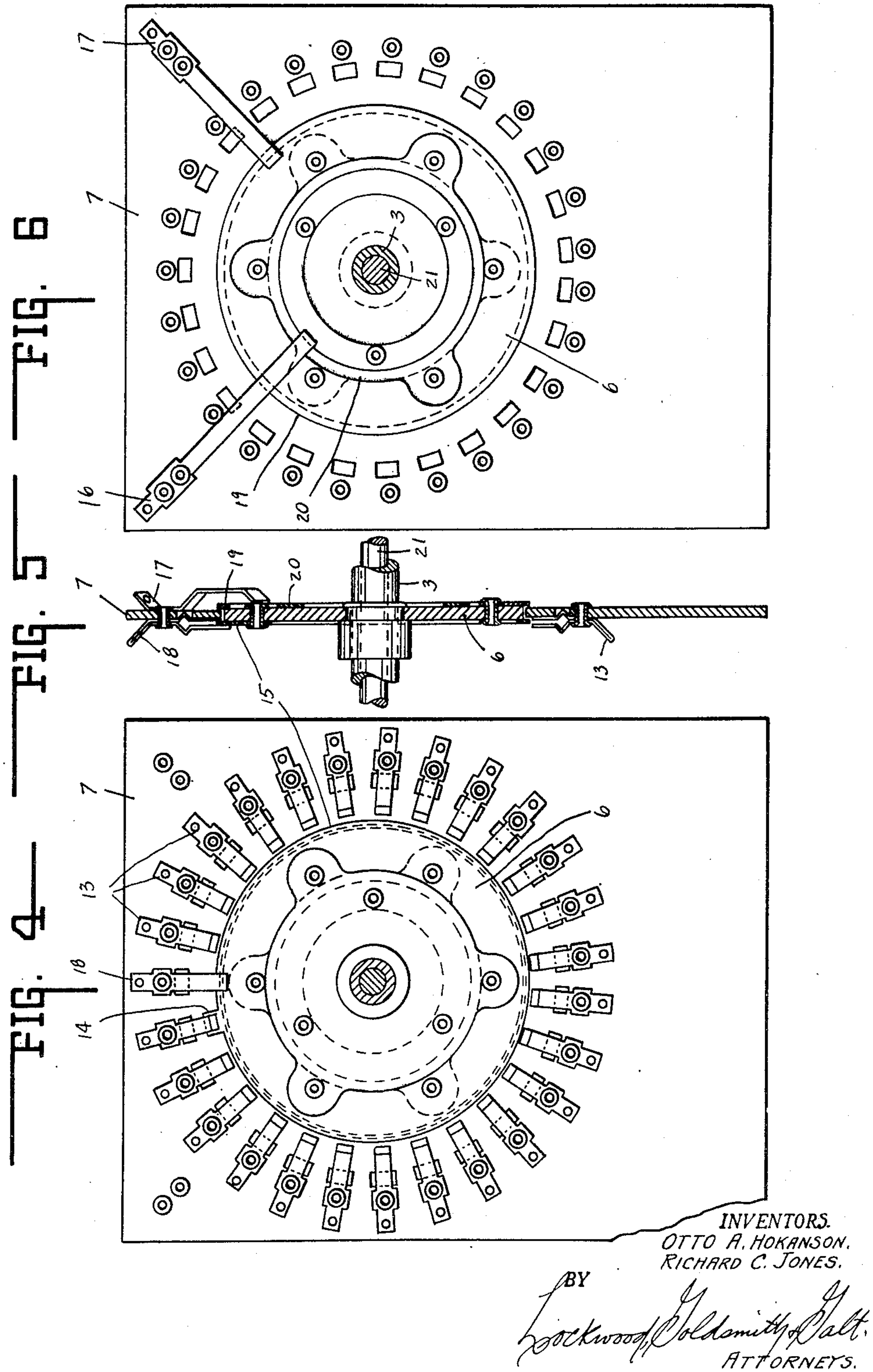
Fig. 4 is a rear elevation of the circuit control switch for the coin register.
Fig. 5 is a central vertical section therethrough.
Fig. 6 is a front elevation thereof.

Figs. 4, 5, and 6 show the switch plate 7 carrying on one side thereof a circular arrangement of spaced contacts 13, there being twenty-six such contacts shown herein to provide a price range of Twenty-Six Cents. There is one of said contacts for each of the angular positions in which the dial may be locked through engagement of the latch 4 with one of the holes or notches in the panel 5. Said plate also carries a contact brush 18 which is continuously in contact with a contact ring 15 carried about the rotating switch member 6. On the opposite side of said plate there are provided two contact brushes 16 and 17, the latter conveying current to a pair of concentric rings 19 and 20 on said member 6. The contact ring 15 is provided with an outwardly projecting tongue 14 which makes contact sequentially with all of contacts 13.

Figures 7, 8, 9:
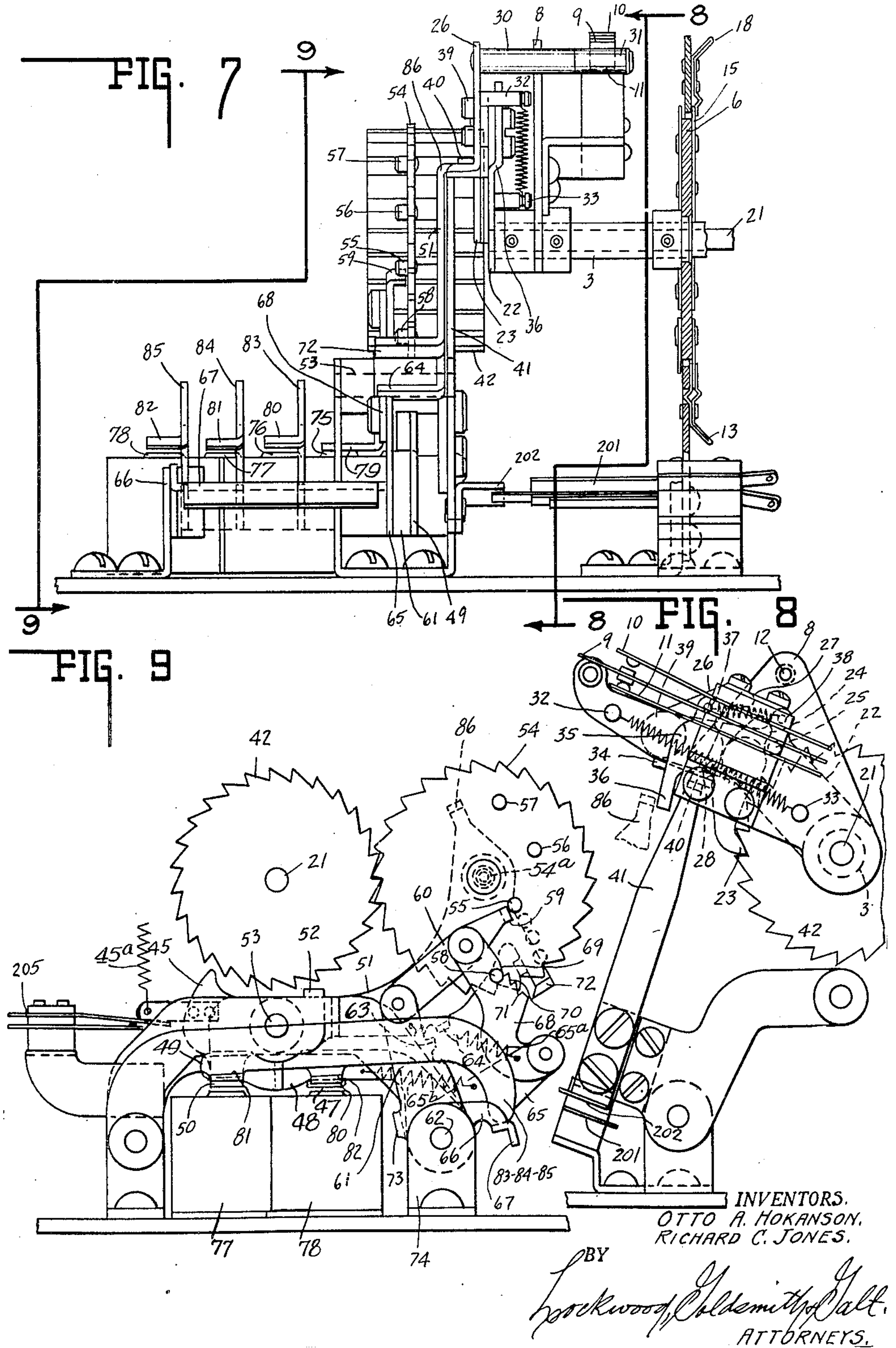
Fig. 7 is a central vertical section with parts in elevation of the arm register mechanism.
Fig. 8 is a front elevation of that part thereof viewed on the line 8—8 of Fig. 7.
Fig. 9 is a rear elevation of a part of the mechanism shown in Fig. 7 viewed on the line 9—9 of Fig. 7.
Figures 12, 13:
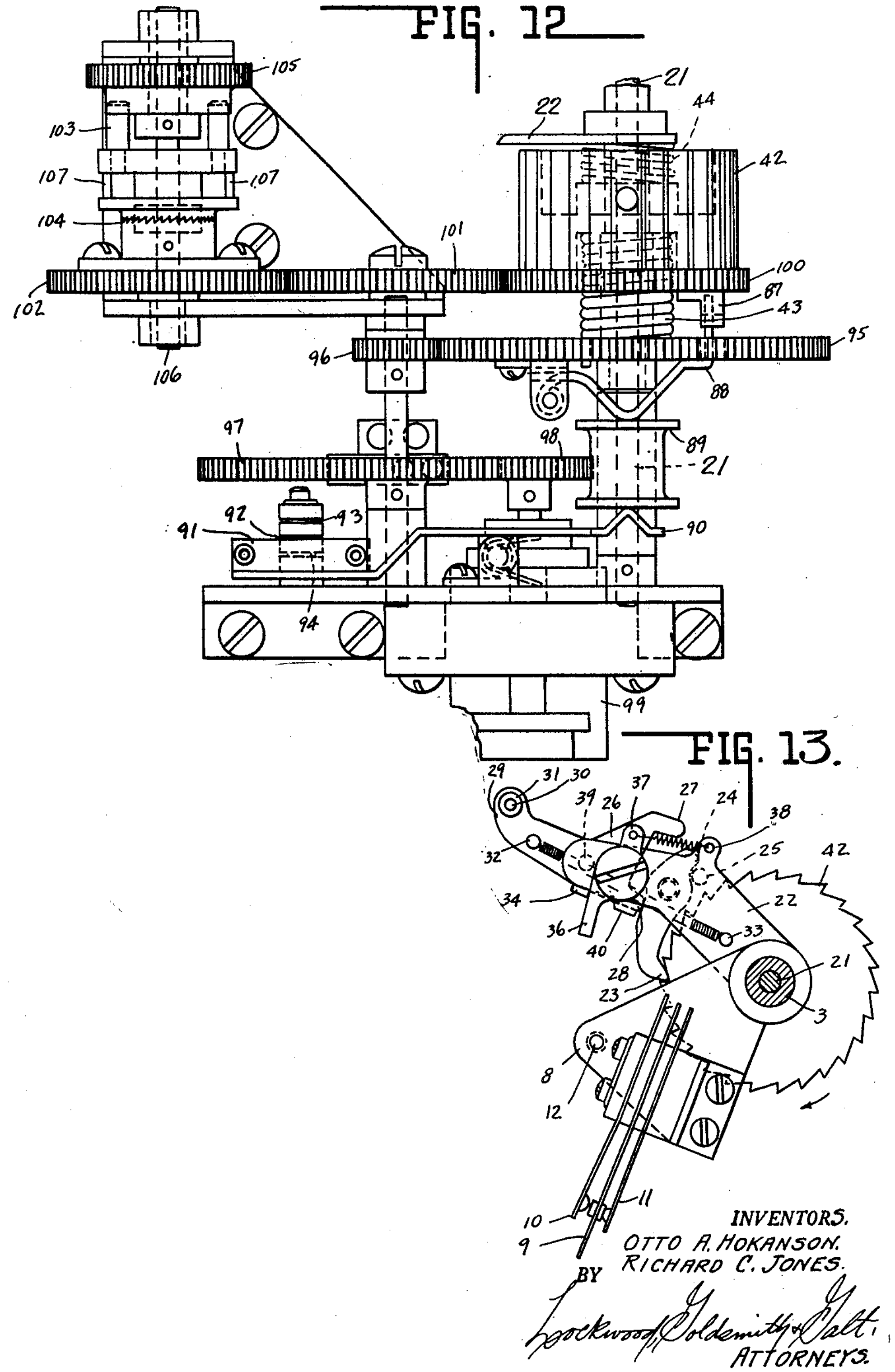
Fig. 12 is a plan view thereof.
Fig. 13 is an elevation illustrating that part of the mechanism shown in the upper portion of Fig. 8 moved to operated position.

Next to the price arm 8 and revolving freely around a shaft 21 there is a pawl arm 22 (Figs. 8 and 13). Said arm carries a pawl 23 having a nose and a tail 24 which abuts against a stop stud 25. Pivoted at its outer end the pawl arm carries a striker 26 having two striking ends 27 and 28 which alternately impinge upon the pawl when the striker oscillates about its center 39. The striker 26 is formed at its outer end with a stud 30 which is provided for part of its length with an insulating sleeve 31. The sleeve, when the striker is in one position, permits contact between the switch leaves 9 and 11, and when in the other position compels them to separate and forces switch leaf 9 into contact with switch leaf 10. The pawl and striker are on the side of the arm 22 remote from the price arm 8. A lug 34 is bent toward arm 8 to act as a stop for a latch 36 which is urged toward the lug by a spring stretched between said latch 36 and pawl arm. The striker is held in one or the other of its positions by an over center spring stretched between studs 32 and 33 on said striker and pawl arm, respectively. Striker 26 is also provided with a lug 40 which is bent inwardly to abut against the end of stop arm 41.

Figures 10, 11, 16:
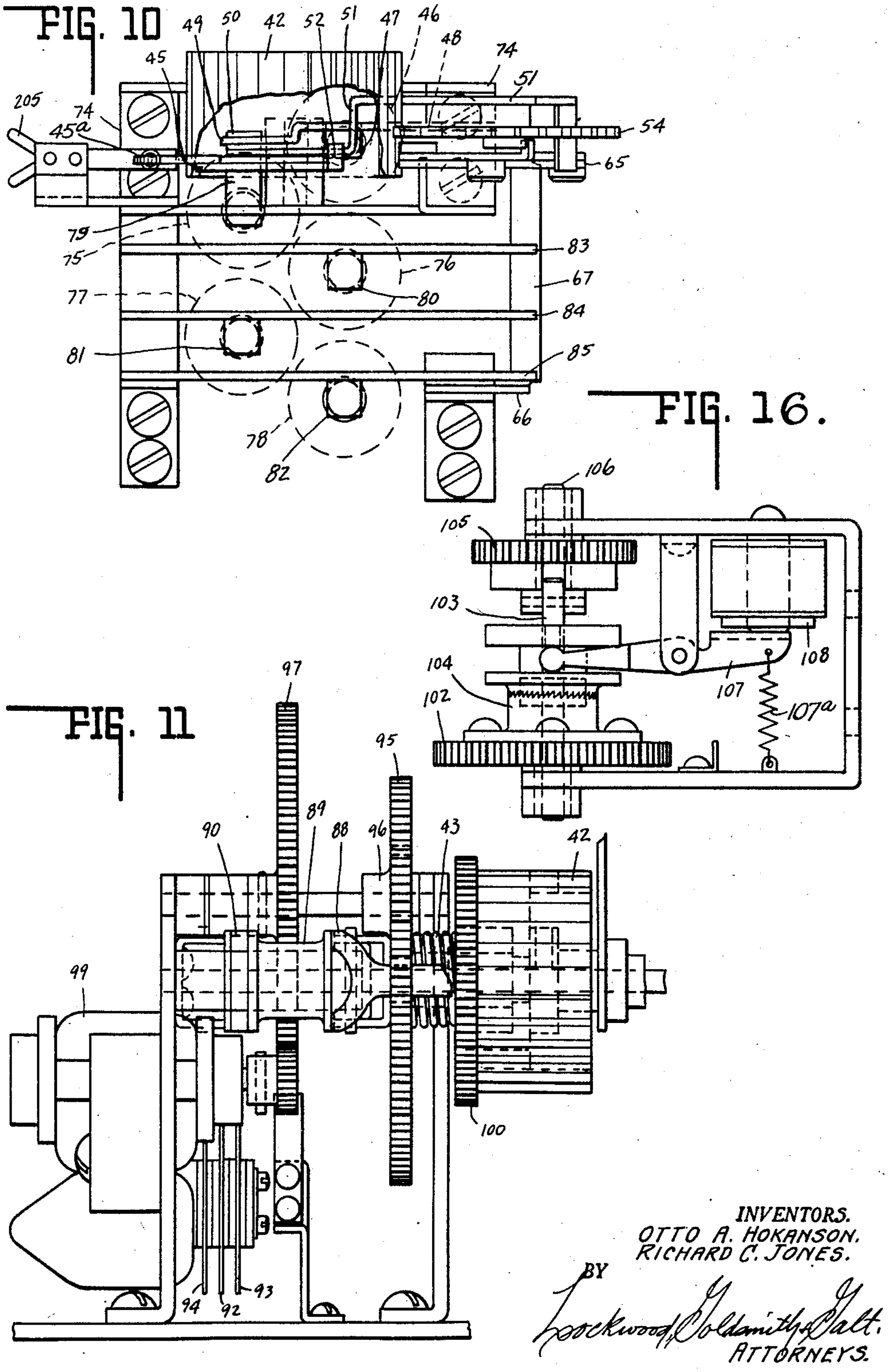
Fig. 10 is a plan view of the part of said mechanism shown in Fig. 9.
Fig. 11 is a side elevational view of the power transmission unit between the coin register and change maker involving parts of the mechanism shown in Figs. 7, 9, and 10.
Fig. 16 is a detailed view of the clutch control mechanism of the power transmission shown in Figs. 11, 12, and 14.

As shown in Figs. 8, 9, and 10, a ratchet wheel 42 revolves on the shaft 21, its teeth being engaged by the pawl 23 as shown in Fig. 8. Said ratchet wheel is revolved by a spring 43, as best shown in Fig. 12, and carries said pawl 23 clockwise as in Fig. 8, and counterclockwise in the position of the ratchet 42 shown in Fig. 9. A spring 44 (Figs. 11 and 12) is wound up by the spring 43 and in unwinding returns pawl 23 to the position shown in Fig. 8. The ratchet 42 is permitted to revolve by the removal of detent 45 (Fig. 9) from its teeth when the magnet 46 (Fig. 10) is energized. Magnet 46 attracts armature 47 attached to a lever 48, the free end 49 of which (Fig. 9) presses downwardly on a lug 50 bent outwardly from the lower edge of a lever 51, to raise the opposite end of said lever. Said lever 51 is pivoted on a stud shaft 53 pivotally connecting levers 51 and 48 extending parallel to and directly beneath the shaft 21. A lug 52 is carried by the detent 45 so as to be lifted by the lever 51 when the latter is raised by depression of lug 50.

Rotatably attached to the free end of the lever 51 there is a toothed stop wheel 54 (Fig. 9). A coil spring 54*a* (Fig. 9) is mounted about the hub of said wheel to urge it to revolve counterclockwise. Whenever the magnet 46 is energized, the stop wheel 54 is moved to engage its teeth with those of the ratchet 42 to be revolved clockwise thereby. On one side of the stop wheel 54 there are provided four stop studs 55, 56, 57, and 58. Their position at the beginning of revolution of the stop wheel is shown in solid line, and their position at the end of its revolution is shown in broken line. An adjustable stop link 60 is provided at its free end with an abutment 59 bent toward the wheel 54 and movable into path of said studs. The link 60 is pivoted upon the free end of an arm 61 which is notched at 63 to receive and support a lug 64 bent inwardly from arm 51, arm 61 being mounted to oscillate about shaft 62. Also oscillating about shaft 62, independently of arm 61, there is an arm 65 connected to a shorter coaxial arm 66 by a bail 67 (Figs. 9, 10). Arm 65 and stop link 60 are connected by a latching link 68 which has formed in its outer edge three notches 69, 70, and 71 so located as to engage the edge of a latch bar 72 which extends from the lever 51, when arm 65 and link 60 are depressed. Said stop link 60, arm 61, arm 65, and the link 68 are held in the position shown in Fig. 9 under tension of the springs 65*a* and are drawn under the tension of spring 65*b* against a stop 73 bent from a frame 74.

As shown herein (Fig. 9), the four stop studs 55—58 carried on the stop wheel 54 are related to the following coins: Stop 55 represents the stop position for a one cent piece; stop 56 represents the position for a nickel; stop 57 represents the position for a dime; and stop 58 represents the position for a quarter. The coin register and change maker as shown herein being limited to said four coins, it is to be understood that they may be extended to include a half dollar, if desirable.

In addition to the magnet 46 which operates with every coin inserted, there are four additional magnets. Magnet 75 (Figs. 9, 10) is manually operated by a push button 200 to be hereinafter referred to. Magnet 77 is operated by each nickel deposited. Magnet 78 is operated by each dime deposited. Magnet 76 is operated by each quarter deposited. They respectively attract armatures 79, 81, 82, and 80, which are respectively integral with the levers 51, 84, 85, and 83. Said armatures 81, 82, and 80 are located at varying distances above their magnetic cores, so that upon attraction they will move their levers proportionate distances. The free end of each lever is located above and just in contact with the bail 67. Thus, when a magnet is energized, bail 67 is depressed by one of said levers a predetermined distance. The arm 65 is thereby depressed an equal distance, and by means of a spring 65*a* connected between arms 65 and 61, arm 61 is carried with it until it strikes lug 64 and supports it together with the arm 51 through engagement by said lug with the notch 63. In the meantime the link 68 will have been moved to a position where one of its three notches, 69—71, is engaged by the latch bar 72. This bar locates the lug 59 in the path of one of the stop studs 55—58.

Whenever arm 51 rises, it lifts the lug 52 to depress the detent 45, freeing the ratchet wheel 42. Thereupon the ratchet wheel is revolved by the spring 43 and with it revolves the stop wheel 54. This action continues until one of the coin related studs 55—58 encounters the lug 59 on the link 60, striking it hard enough to dislodge the engaged notch of link 68 from the latch bar 72. By the same impact, the notch 63 on the arm 61 is knocked from under the lug 64 so that arm 51 drops back to its normal position, disengaging the stop wheel 54 from the ratchet wheel 42. A spring 45*a* returns the detent 45 on the arm 51 into engagement with the teeth of the ratchet wheel 42 to stop its rotative movement due to the spring 43. In this manner the stop wheel 54 has been revolved through a predetermined angle corresponding to the number of teeth between the starting and stopping point of one of the engaged studs 55—58. The ratchet wheel 42 has therefore revolved through a similar angle.

Since the pawl 23 (Figs. 8, 13) is engaged by a tooth on the ratchet wheel 42, the pawl arm 22 is revolved through the same angle of revolution as said ratchet wheel and stop wheel. If the price arm 8 has been set forward by the dial 1 through a greater angle, the pawl arm 22 fails to reach it and further revolution of the ratchet wheel 42 becomes necessary. This is accomplished by again activating one of the magnets which may or may not cause stop wheel 54 to revolve far enough to allow the ratchet wheel 42 to move through a sufficient angle of rotation. If not, the process is repeated until the pawl arm meets the price arm, until sufficient coin values have been deposited to activate the magnets to cause the pawl arm to meet the price arm in the manner above described.

When the arms meet (upon sufficient coin values being deposited to meet the price of the article), the stud 12 on the price arm 8 interferes with the striking end 27 on the striker 26, knocking it inward upon tail 24 of the pawl 23, causing said pawl to engage the stud 25 to be held thereagainst by the over center spring. The movement of the striker 26 around the pivot 39 forces the insulating sleeve 31 sharply against the leaf switch 9, forcing the latter to make contact with the leaf 10 and break contact with the leaf 11. The pawl 23, having been released from the teeth of the ratchet 42, it returns to its original position. If the exact price of the article has been paid by the deposit of coins of that aggregate value, the stop wheel 54 has no tendency to allow the ratchet wheel 42 to revolve beyond the point where contact has been made between the pawl arm 22 and the price arm 8. In that case the lever 51 has returned to normal position and the lug 86 (shown by dotted lines in Fig. 8) is out of the path of the latch 36 so that the lug 40 encounters the tip of the stop arm 41 and further movement of the pawl arm 22 is thereby arrested. As the lug 40 is a part of the striker 26 (Fig. 13) the latter is turned around the center 39 thereof and the striking end 28 drives the pawl 23 into re-engagement with the teeth of the ratchet wheel 42.

However, had the stop wheel 54 not ceased revolving when the arm 22 met the arm 8, the lever 51 would not have been released from the support of the arm 61. Therefore, the lug 86 would be raised into the path of the latch 36 which would stop thereupon and hold the lug 40 from contact with the tip of the stop arm 41 (Fig. 8). Thus, the pawl 23 would not be forced into engagement with the ratchet wheel 42 and would not move therewith. But as soon as stop wheel 54 ceases to revolve and arm 61 has been moved from its support of the lug 64, the arm 51 would drop and remove the lug 86 from its support of the latch 36. The arm 22 would then carry the lug 40 into contact with the stop arm 41 to return the striker 26 for pawl engagement with the ratchet wheel 42. The purpose of this delay of re-engagement between the pawl on the striker 26 and the ratchet 42 is to permit the stop wheel 54 to complete its revolution without thereby setting up the monetary value credit on the succeeding paid transaction which would result from the ratchet wheel again moving the pawl through an angle toward the price arm 8 and leaving it in that relative position.

Figure 15:
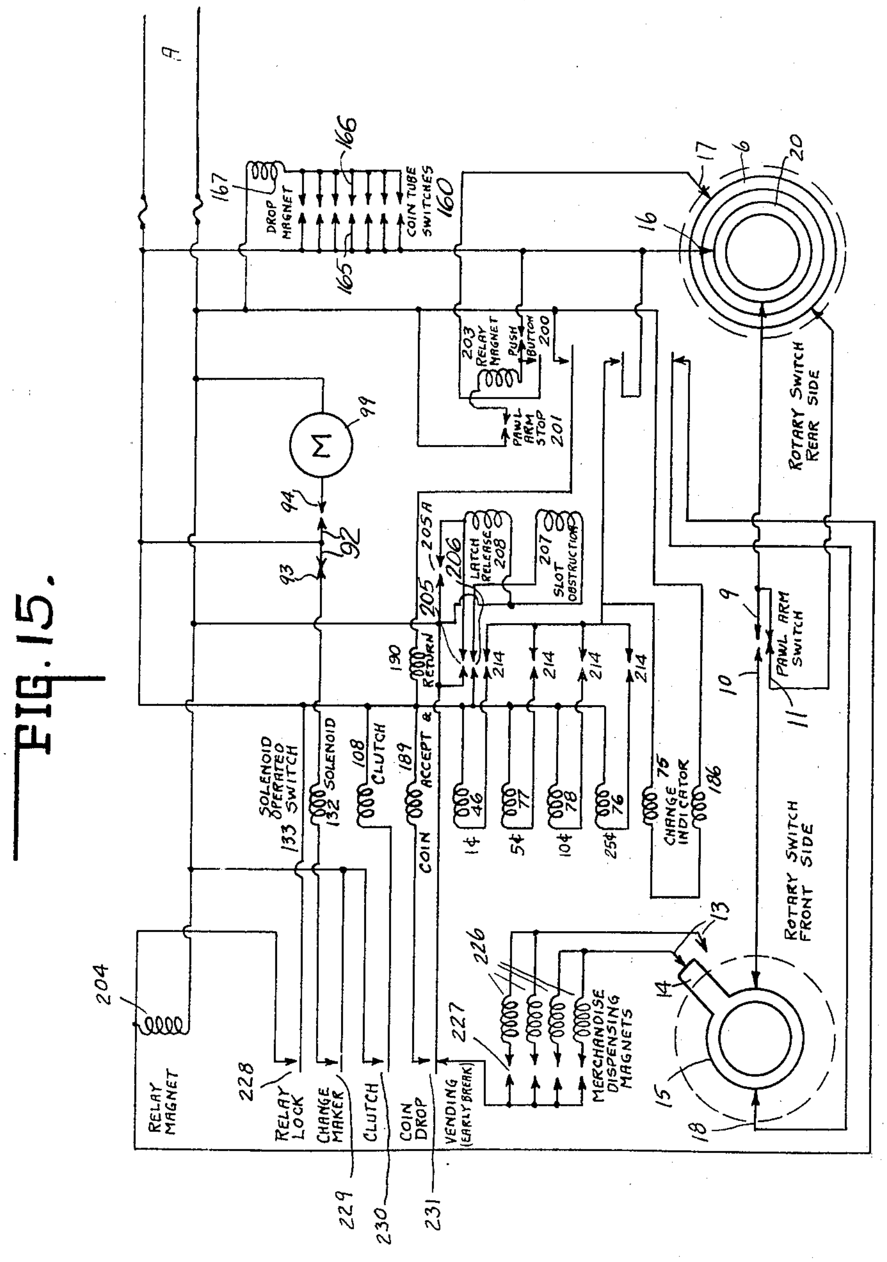
Fig. 15 is a wiring diagram showing the interconnecting control circuits of the coin register, change maker and merchandise dispensing magnets.

In Figs. 12 and 14, there is shown a gear 100 attached to the rear end of the ratchet wheel 42. Said gear is provided with a cam 87 extending laterally therefrom. Said cam acts upon a lever 88, causing it to move a sleeve 89 lengthwise to press upon a lever 90 which in turn pushes an insulator 91 against a switch contact leaf 92, causing the latter to make contact with contact leaf 93 and break contact with contact leaf 94. As the ratchet wheel 42 is revolved counterclockwise by spring 43, cam 87 is moved away from the lever 88. The resulting closure of the switch contacts 92, 94 closes the circuit to energize and start the motor 99 (Fig. 15). Said motor drives the mechanism through a train of gears 95, 96, 97, and 98 to reduce the speed at which the mechanism is driven to approximately 60 R. P. M. One end of the spring 43 is attached to a gear 95 which winds it up until the lever 88 catches up with the cam 87, thereby moving the lever 88 to open switch 92, 94 and stop the motor 99.

Through the above described mechanism the coin register serves to evaluate the coins deposited, in relation to the value setting or price of the merchandise to be dispensed, the mechanism for actuating the change maker according to the coins deposited and value setting to be hereinafter described. However, in connection with the coin register mechanism and through the gear 100 associated therewith, the change maker functions in the following described manner to indicate the difference between the valuation of the coins deposited and the value setting or price of the article, and translate such difference into change making coins to be returned to the depositor.

For actuating the change maker mechanism, the gear 100, above described, which is connected with the ratchet wheel 42 of the coin register, meshes with an idler 101 (Figs. 11, 12, and 14), which turns a clutch drive gear 102. A clutch 104 is provided with twice as many teeth as there are prices so that the delay in engagement will not put the change maker mechanism out of synchronism with the ratchet wheel 42. A pair of pins 103 are rigidly fixed in the driven member of the clutch 104 so that their ends constantly engage in the groove formed in the hub of a gear 105 to which they transmit power from the gear 102. The clutch 104 is operated by the mechanism shown in Fig. 16, wherein a magnet 108 moves a shifter fork 107 when energized. When the switch contact leaves 9 and 10 make contact, and provided the stop wheel 54 is still engaged and revolving, a spring 107a (Fig. 16) returns the shifter fork 107 after its operation.

The gear 105, as shown in Fig. 16, meshes with a cam shaft gear 109 (Figs. 17, 18), which turns cam shaft 110. The latter is concentric with and keyed to a sleeve 111 carried thereon having end flanges, there being attached to one of said flanges the cent cam 113 and to the other flange the nickel and dime cam 112. Said shaft 110 revolves against the tension of spring 114 which returns it to inoperative position with stop 115 on the gear 109 engaging a stud 116 mounted on the shaft bearing support 117.

Figure 17:
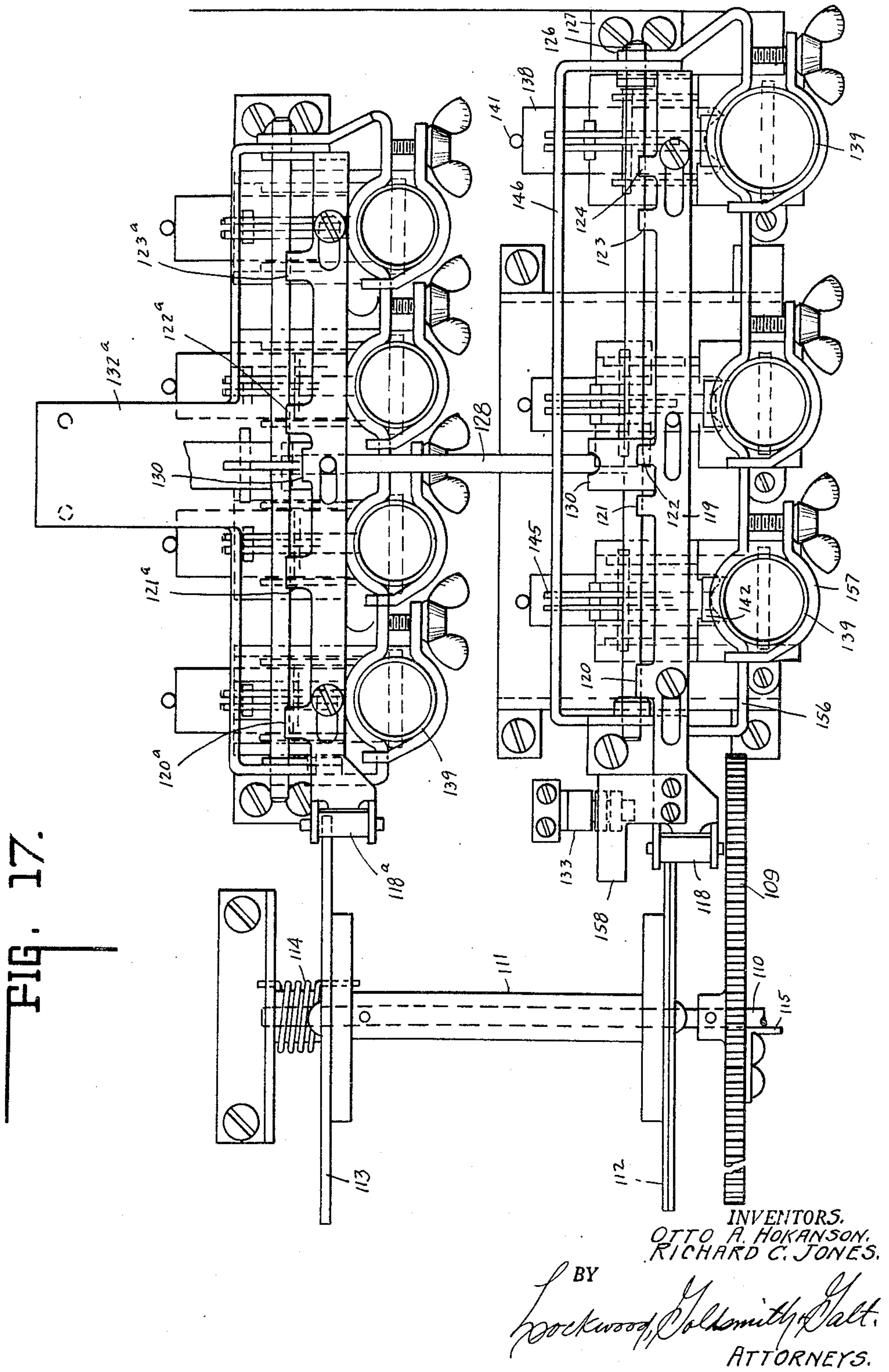
Fig. 17 is a plan view of the change maker mechanism.
Figure 18:
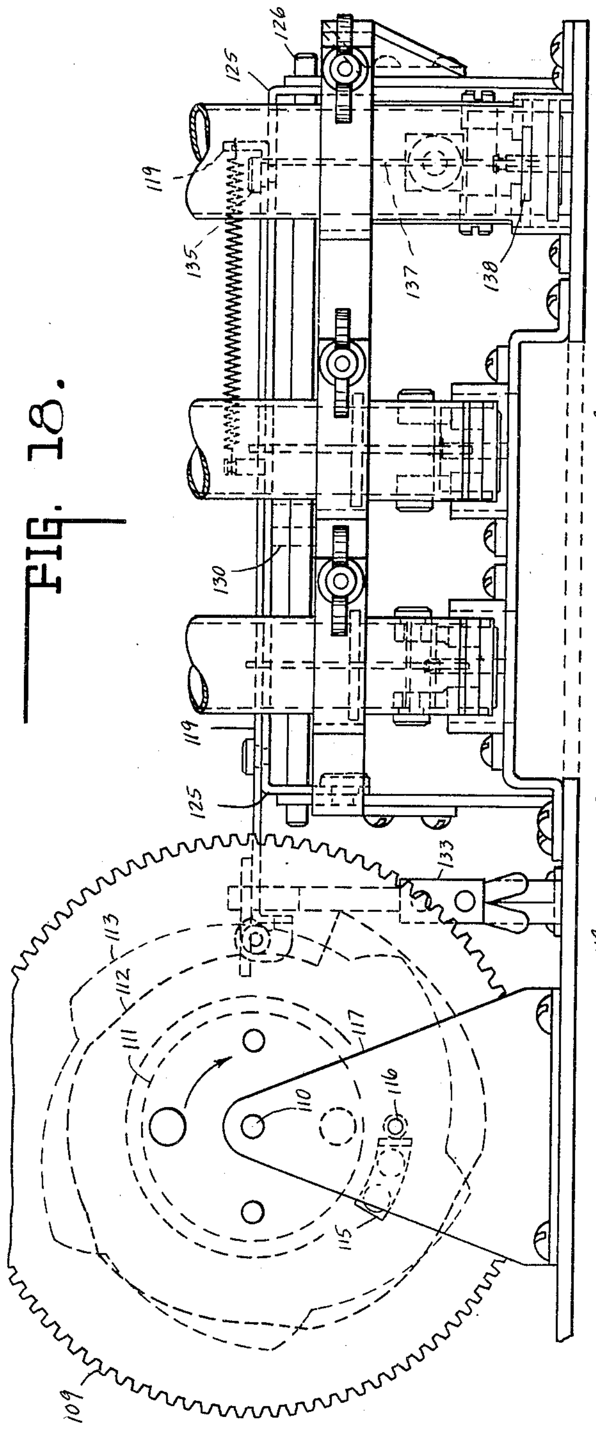
Fig. 18 is a front elevation thereof.
Figure 19:
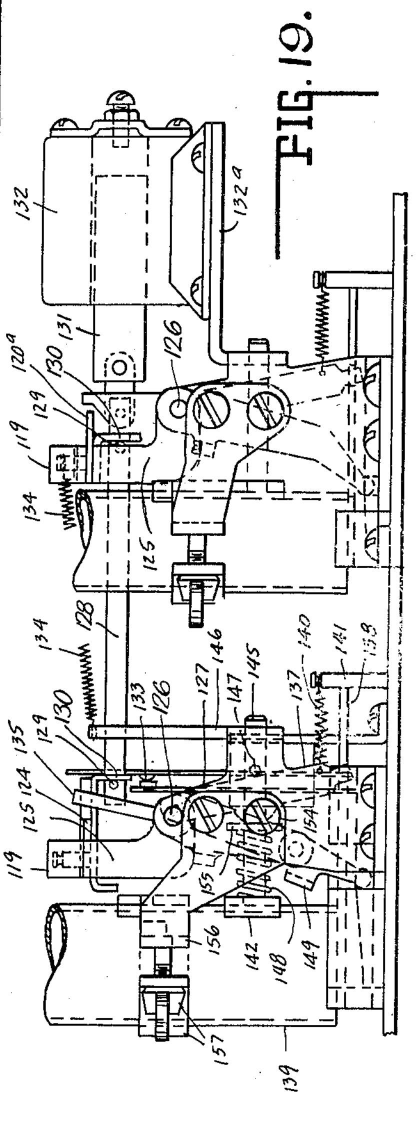
Fig. 19 is an end elevation thereof.

Cam 112 actuates a cam follower 118 attached to the end of a slide 119 provided at its rearward edge with lugs 120, 121, 122, 123, and 124, as shown in Figs. 17, 18, and 19. Said lugs are so located that when the cam is in one position a lug is opposite the lever which discharges a nickel from the nickel tube 131; when in the next position a lug is opposite the lever which discharges a dime from a dime tube 139; when in the next position a lug is opposite the levers of the nickel tube and a dime tube, so that fifteen cents is discharged; and when in the next following position, a lug is opposite each of the levers which discharges a dime from each dime tube. Each of such positions exists throughout a considerable angle on the cam 112, while the corresponding angle on the cent cam 113 is filled with five positions.

The cent cam 113 is engaged by cam follower 118a attached to the end of slide 119a. Said slide is provided in a similar manner to the slide 119 with a series of laterally extending spaced lugs 120a, 121a, 122a, and 123a, one for each one cent tube. The first position of the cent cam 113, corresponding to that of the cam 112, is an inoperative position, where no lugs are placed opposite a cent discharge lever. The next position of this cam places one lug opposite a lever so that one cent is discharged; the next position places two lugs opposite two levers to discharge two pennies; the next position places three lugs opposite three of the levers to discharge three pennies; and the next position places all four lugs opposite the four levers so as to discharge four pennies. In this manner, in addition to the change making discharge of a nickel, dime or combination thereof, it may be made of one, two, three, or four cents, or the combination thereof, with the discharge of nickels and dimes. In this manner the amount of change up to twenty-four cents may be made through operation of the mechanism particularly illustrated herein. The first angle on the cam 112 is inoperative throughout the effective operation of the cam 113 so as to permit the change making discharge of one, two, three, or four cents without any discharge from the nickel and dime tubes.

The slides 119, 119a are mounted on rocking members 125, 125a which are pivotally mounted on the rods 126, 126a, respectively. Said rods are supported by the respective brackets 127. They are rocked by a rod 128 having pins 129 (Fig. 23) which retract forks 130 integral with said rocking members. Said rod is moved by core 131 when drawn into solenoid 132. The latter is energized by contact being made between the switch contacts 9, 10 and de-energized by the opening of switch 133. Said rocking members are returned to their normal position by the springs 134.

Figure 20:
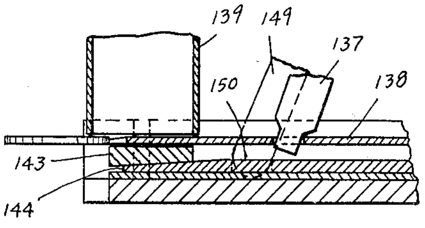
Fig. 20 is a diagrammatical cross section of the change maker coin tube showing a coin being dispensed therefrom.
Figure 21:
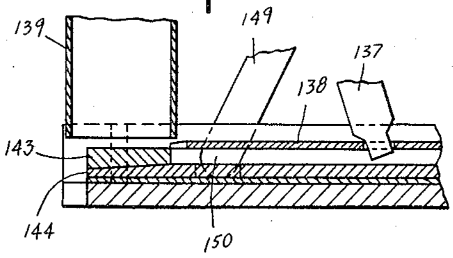
Fig. 21 is the same as Fig. 20, showing the parts in normal retracted position.
Figures 22, 23:
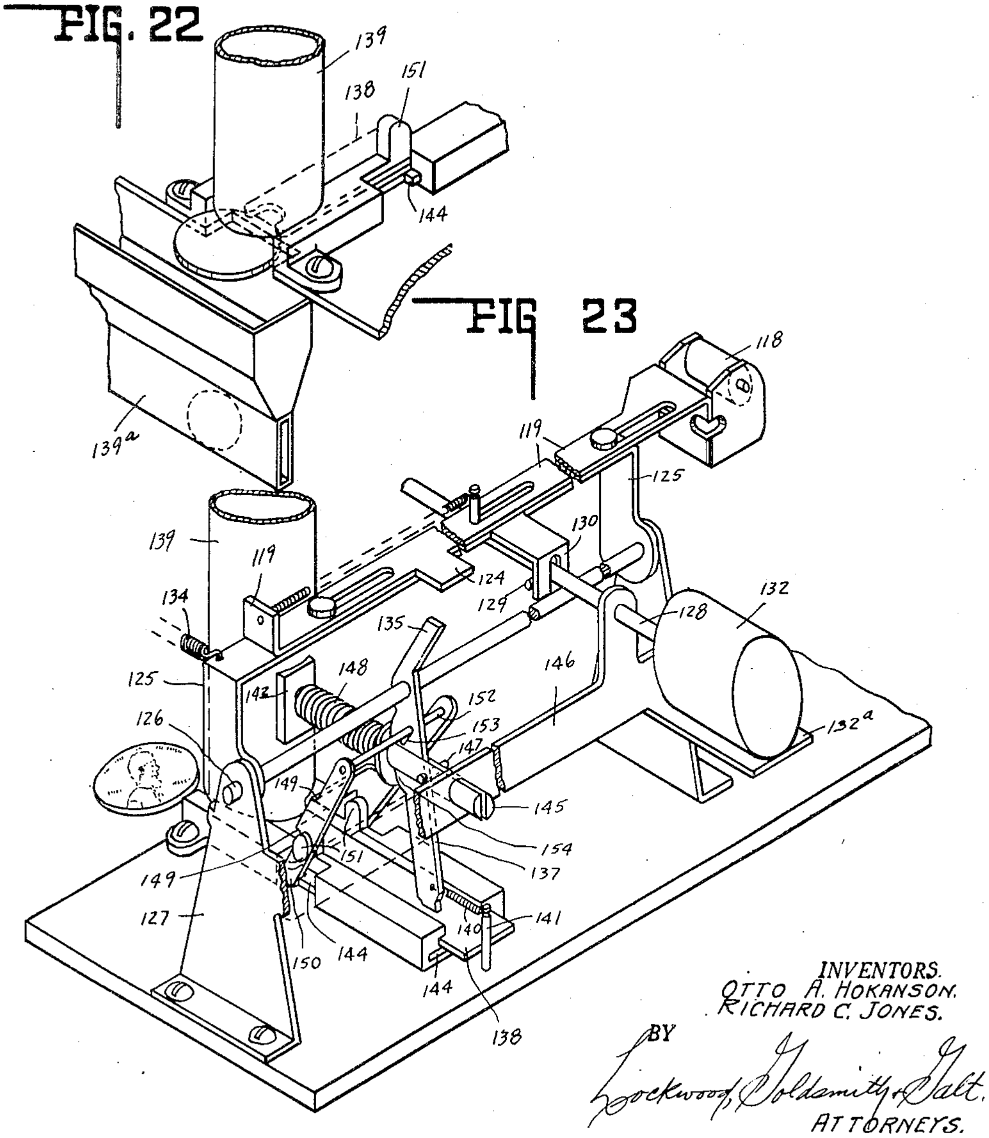
Fig. 22 is a perspective view thereof associated with a coin chute with parts removed.
Fig. 23 is a perspective view of a portion of the change making mechanism of Fig. 17 with parts broken away.

As the operation of the coin discharging levers is the same throughout, a description of one will suffice. In Figs. 17, 18, the lug 124 strikes the end of lever 135 to swing the actuating end thereof indicated at 137 to the left (Fig. 19), and drive the coin discharge slide 138 against the edge of the lowermost coin lying at the bottom of a coin tube 139 to cause the coin to move to the left and fall into a chute 139*a*, as shown in Figs. 20, 22, and 23. A spring 140 returns the lever 137 and slide 138 to normal position from that of Fig. 20 to that of Fig. 21, said spring being shown in Fig. 20, and being anchored to a stud 141 which also serves as a stop for the slide 138.

To insure that the lowermost coin in each tube shall be free of the weight of the superimposed coins, each tube is provided with a clamp 142 (Figs. 17, 19, and 23) to hold the coins in its grip and those above from movement during discharge, and a downward movable floor 143 to allow the few lowermost coins to be relieved of the pressure of the column of coins above (Figs. 20, 24). The floor 143 is lowered and elevated through the action of a sliding wedge plate 144 which is notched on each edge to receive the ends 150 of a forked lever 149. Said lever is pivoted to the base at 151. Its upper end is provided with a rod 152 extending from one to the other of its bifurcations through a slot 153 in the lever 137. The clamp 142 is fastened to the end of a plunger 145 which is slotted the greater part of its length, lever 137 passing through its slot. The rearward edge of lever 137 is in contact with a small pin 147 positioned transversely of the plunger 145 serving to withdraw the clamp 142 upon the return movement of the lever 137. On the forward movement, lever 137 bears upon a washer 155 to compress a spring 148 and move the clamp 142 yieldingly against a group of coins in the tube 139. When the rod 152 is moved to the left by lever 137, its forked ends 150 are moved to the right a short distance, carrying the wedge 144 in the same direction. The slope and movement of the wedge are calculated to lower the coin supporting floor 143 sufficiently to free the coins below the group which are clamped. The brackets 127 are joined together by a bridge 146 which is suitably perforated to support the outer ends of the plungers 145.

The coin tubes 139 are supported by a bridge 156 extending from one end to the other of the bracket 127, being curved at appropriate locations to fit the circumference of the tubes. Each tube is held individually against the bridge by a clamp 157 which hooks into a notch at one of its ends to be held therein by a wing bolt. The switch 133, which controls the solenoid 132 acting to rock the slides 119 and 119*a* is actuated by an insulator 158 riveted to the slide 119 as shown in Figs. 17 and 19. The solenoid 132 is supported upon a bracket 132*a* carried by a bridge 146. The mechanism above described is the same with respect to the penny tubes 139 and the slide 119*a* therefor, both mechanisms for discharging the nickels and dimes as well as the pennies being actuated to function in the same manner through the action of their respective operating and control cams 112 and 113, respectively.

Figure 26:
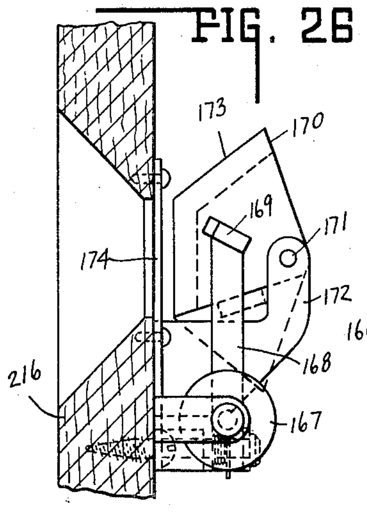
Fig. 26 is a central vertical section through a no-change indicator controlled by the unit of Figs. 24 and 25.
Figure 27:
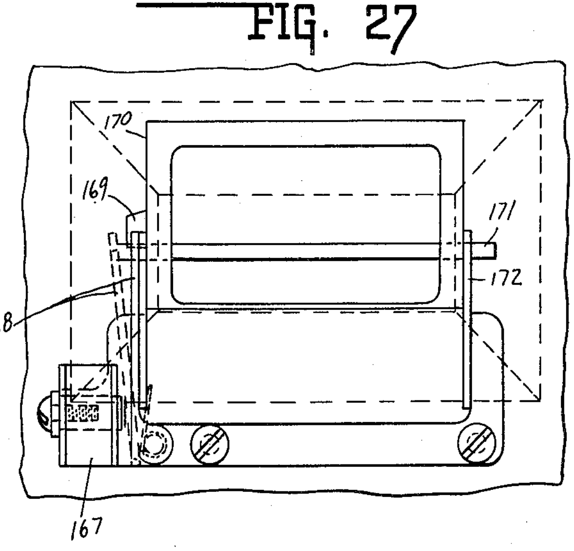
Fig. 27 is a rear elevation of said indicator.

For signalling the absence of coins in the coin tubes 139 there is provided a signal switch shown in Figs. 24, 25. A bracket 159 supports an insulating segment 160 upon which there is pivoted at 162 a swinging insulating segment 161. Segment 160 is provided with the electric contacts 165, 166, while segment 161 is provided with an arcuate contact 164 formed and arranged to bridge contacts 165, 166. The nose 163 on the swinging segment 161 enters a slot in the coin tube 139. The contacts 165, 166 are arranged so that they are normally out of communication through the arcuate contact 164. When the segment 161 swings to its innermost position, the contacts 165, 166 are bridged momentarily by the arcuate contact 164 to send an impulse to the magnet 167. When this occurs the mechanism shown in Figs. 26, 27 is signalled by the impulse which energizes said magnet 167 to attract an armature 168 for withdrawing it from support of a lug 169 formed to extend from one end of a drop plate 170 which revolves upon a pin 171 carried by the brackets 172. Thus, when the magnet 167 is energized through contacts 164, 165, and 166, it means that the nose 163 of segment 161 is free to pass into the coin tube due to the absence of coins.

Figure 28:
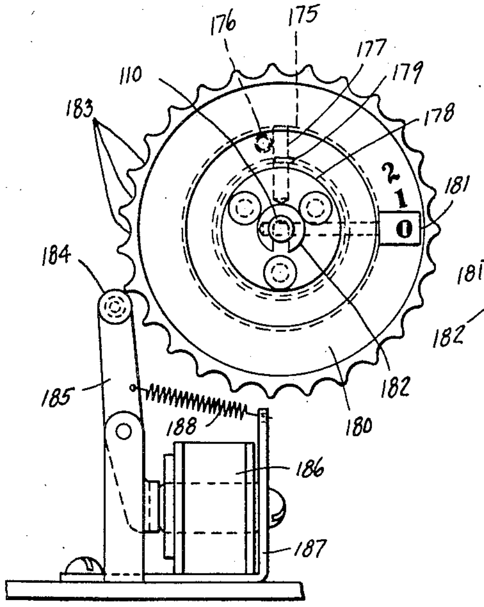
Fig. 28 is a front elevation of the change recording device.
Figure 29:
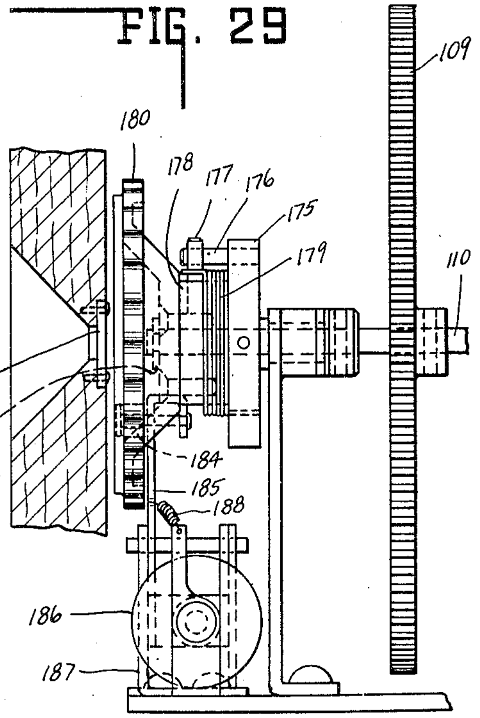
Fig. 29 is a side elevational view of Fig. 28, showing said unit associated with a cabinet panel and the change making cam wheel in elevation.

Thereupon said magnet releases the drop plate 170 which moves by gravity about its pivotal support so that its face 173 is seen through a window 174 in the front of the vending machine to show that there is no change in the machine and that the price of the article must be paid in the exact amount. The drop plate is restored manually by lifting it until the armature 168 returns to supporting position for the lug 169. For disclosing to the purchaser the amount of change to which he is entitled there is shown in Figs. 28 and 29 an indicating mechanism operated by the change making cam shaft 110. The end of said cam shaft adjacent the front of the vending machine has pinned thereto a collar 175 in which is fixed a pin 176 extending at right angles to and in the plane of a similar pin 177 radially to a loose collar 178. The collars 175, 178 are connected by a spring 179 arranged to be wound up when pin 176 moves away from pin 177 and unwound when pin 177 returns to contact with pin 176. Screwed to the collar 178 there is a number wheel 180 with appropriate numerals on its face adjacent the front of the vending machine so as to be visible one by one through the window 181. The wheel 180 is retained on the end of shaft 110 by a washer 182.

The wheel 180 is provided throughout its periphery with notches 183 to be engaged by a swinging detent 184 mounted on the end of a lever 185, the other end of said lever comprising the armature of magnet 186 supported upon the base plate 187. A spring 188 holds the detent in engagement with the wheel.

When the change making cam shaft 110 has been revolved to a position for discharging a certain amount of change, the pin 176 drives the pin 177 through an appropriate angle, detent 184 meanwhile rolling from one to another of the notches 183. Shaft 110, upon delivery of the change, returns to initial position as explained above, but detent 184 holds the change indicating wheel 180 so that the visible figure thereon agrees with the sum of change returned to the purchaser, said figure remaining visible through the window 181 until the next transaction. Spring 114 being considerably stronger than the spring 179, the latter is wound up when the former returns shaft 110 to zero. Deposit of the first coin of the next transaction closes one of the coin switches, all of which are in series, parallel wih the magnet 136, which thereupon withdraws the detent 184 from its engaged notch, allowing spring 179 to return the pin 177 and its associated parts to zero position.

Figures 30, 31, 32, 33:
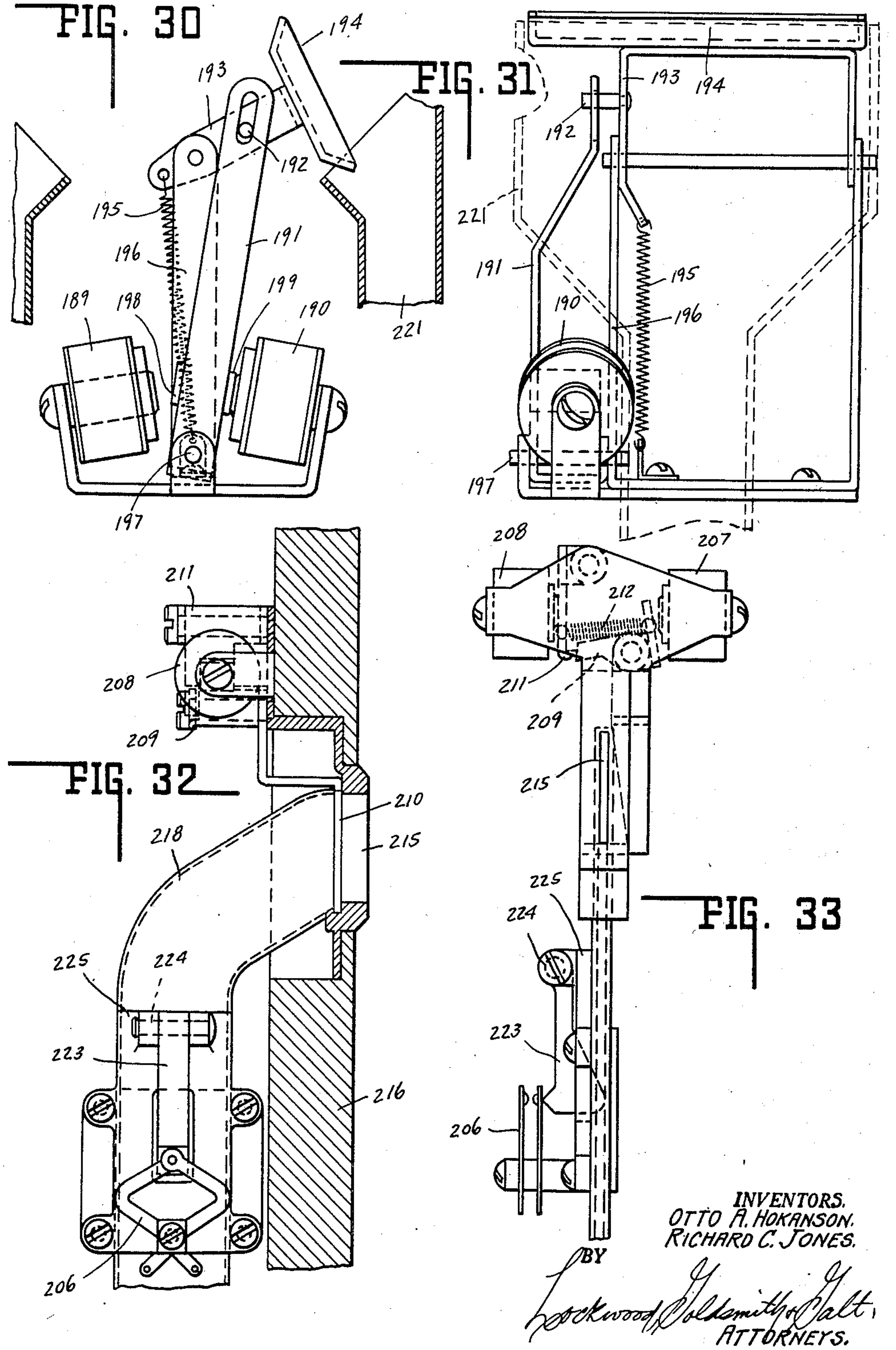
Fig. 30 is a front elevation of the coin tray unit in tilted position.
Fig. 31 is a side elevation thereof.
Fig. 32 is a central vertical section through the coin slot and associated shutter and coin chute.
Fig. 33 is a front elevation of the unit shown in Fig. 32.

The mechanism for distributing the coins deposited in the machine is shown in Figs. 30 and 31. When a purchaser deposits a series of coins, it is desirable to hold them temporarily out of the coin box until payment in full has been made. For this purpose there is provided a pair of magnets 189, 190. One of said magnets is operated by the machine only when payment in full has been made, the other being operable by a push button 200 (Fig. 15) in control of the purchaser, whereby the magnet may be energized at any time before the pawl arm 22 reaches the price arm 8. The magnets attract armatures 198 or 199 to swing a lever 191 to the right or left, and by means of a stud 192 and lever 193 dump a coin receiving tray 194 in one direction or the other. A spring 195 returns the receiving tray 194 to its horizontal receiving position. Coin chutes, as hereinafter referred to, lead from each side of said tray, one to the coin box and the other to a suitable opening in the front wall of the vending machine, as will be hereinafter described, where they may be readily picked up by the purchaser. In order that the return of coins will be rendered impossible at any other time, a switch 201 (Figs. 7 and 8) is normally held open by an insulator 202 on the lower end of the stop arm 41 until the latter is relieved of the pressure exerted thereon by the pawl arm 22. Thus, only while payment is incomplete may the coin be returned.

In Fig. 16 there is shown a relay 203 which locks if the push button 200 is pressed while the switch 201 is closed. This relay closes the circuit through the coin return magnet 190 to dump the coins in the tray into the return chute. It opens the circuit through the coin sorter magnets 46, 77, 78, and 76 (Figs. 10, 15), so that no payment can be registered. It closes the circuit through the stop wheel magnet 75 so that the stop wheel permits the pawl arm 22 to revolve against the price arm 8 and upon the switch contact leaves 9 and 11 to unlock the relay 203, and at the same time opens the circuit through the switch contact leaves 9 and 10 so that it cannot start the merchandise delivering mechanism.

Another relay 204 is locked by the switch contact leaves 9 and 10 as soon as the pawl arm 22 reaches the price arm 8. This enables the change making circuit to close as soon as switch 92, 93 is closed upon cessation of operation of the motor 99. Meanwhile it holds power on clutch magnet 108 to bring the cams to position to make the proper change. It also operates the coin acceptance magnet to empty the tray 194 into the coin box chute. It disables the vending mechanism until the coins are received and are paid out. The relay 204 is unlocked by the opening of the switch 133 when the solenoid 132 is energized by the switch 93 upon the stopping of the motor 99.

A magnet 207 is energized by closing a switch 206 just inside the coin entrance slot 215 in the front panel 216 of the vending machine (Figs. 32 and 33), and unlatched by closing one of the several switches 205 located beneath the coin sorter in such position that all coins, good or bad, strike and operate said switches. While the magnet 207 is energized it closes and latches a swinging obstruction to block the insertion of coins while a coin is passing between the entrance slot 215 and the tray 194. Thus, a subsequent coin cannot pass through unregistered while the machine is active in registering the previous coins. The switches 205 (Figs. 9, 15, 34, 35) are in series parallel with the latch release magnet 208, shown in Figs. 32 and 33. The slot obstruction above referred to comprises a swinging plate 210 provided with a nose 209, allowing a spring 212 to withdraw the plate from obstruction of the coin entrance slot 215.

One switch 205 is located in a slug return chute 213 (Figs. 34, 35) where it is struck by every rejected slug. A similar switch 205A is located adjacent the detent 45 which engages ratchet wheel 42, as shown in Fig. 9, where it is closed each time said detent 45 is operated by a coin, as above described. Thus, whether the object inserted in the coin receiving slot 215 be a coin or a slug, the slot is immediately opened upon rejection of a slug or acceptance of a coin. The group of switches 214, shown in Figs. 15 and 34, are arranged to be closed by coins which have been accepted by the coin selector, thereby setting the machine for operation.

Figure 34:
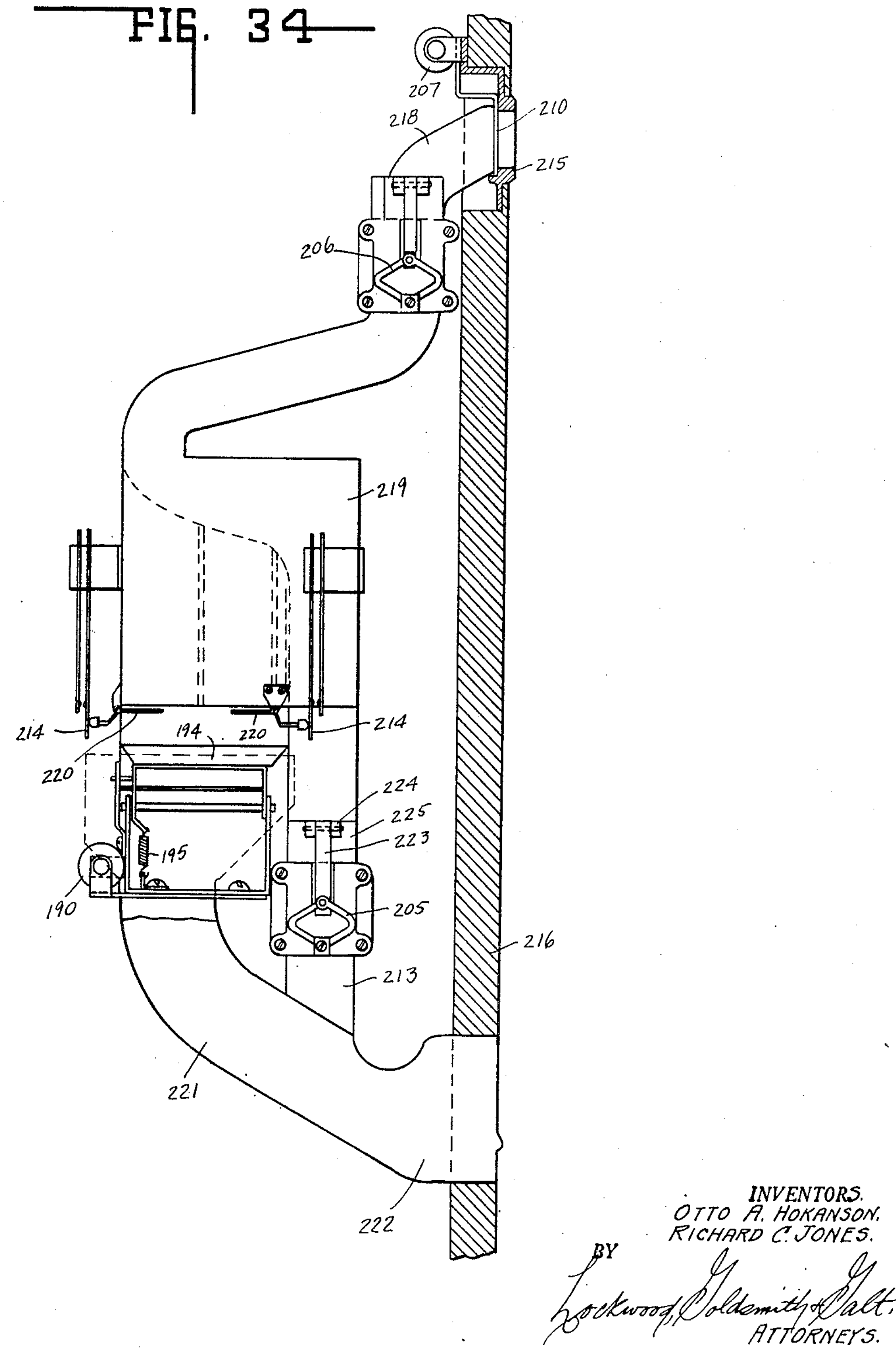
Fig. 34 is a side elevation with parts broken away showing the coin chutes.

As shown in Figs. 32 to 34, inclusive, the front or accessible panel of the vending or other machine in which the coin register and change maker may be employed supports the coin chute 218 through which the coins pass upon being introduced by the purchaser into the single coin slot 215. One of the control switches 208 above referred to, is actuated by the coins as they initially pass through the chute 218 into a coin selector box indicated diagrammatically at 219, reference being had to United States Letters Patent to Adrian No. 2,122,550, granted July 5, 1938. As coin selector boxes are old in the art, no claim being made thereto, it may only be noted that the coins are appropriately selected and segregated, and any slugs among them are separated by a suitable detector to be discharged through the slug return chute 213 to the coin return chute 221 for deposit in the coin dispensing receptacle 222 from which they may be removed.

As above noted, as the slugs pass through the chute 213, they actuate the switch 205 for the purpose and in the manner above described. As the coins are separated in the selector box 219 they actuate the switches 214, one for each denomination of coin. Each switch 214 according to the denomination of the coins, is electrically connected (Fig. 15) with its appropriate solenoid 46, 76. 66, and 78, as above described. Thereupon the evaluated coins pass into the tray 194 which operates to either dump the coins into the coin return chute 221 for return to the purchaser, wherein the value is insufficient, or, on the other hand, dump the coins into a chute leading to the coin box. The switches 205, 206 arranged to be actuated by a slug or coin, respectively passing through their respective chutes, are engaged for closure by a swinging cam plate 223 having a cam head extending into the slot for engagement by the coin and an opposed toe engaging one of the contact leaves of the switch. Said cam plate is pivotally supported for such swinging movement at 224 upon a supporting bracket 225.

In the circuit, Fig. 15, there is provided the usual source of power indicated at A for driving the motor 99 and actuating the various solenoids according to the control of the several switches, as above described. Inasmuch as the mechanism for vending the merchandise is not a part of this invention, no disclosure thereof is presented herein other than in the circuit of Fig. 15, where a series of merchandise dispensing magnets 226 are included, said magnets becoming effective according to the manually operated push buttons 227 operable to close the circuit through said magnets provided the coin register and change maker circuit permits. Also shown in said circuit there is a relay lock switch 228 and change maker switch 229, a clutch actuating switch 230 and a coin drop switch 231.

Figure 35:
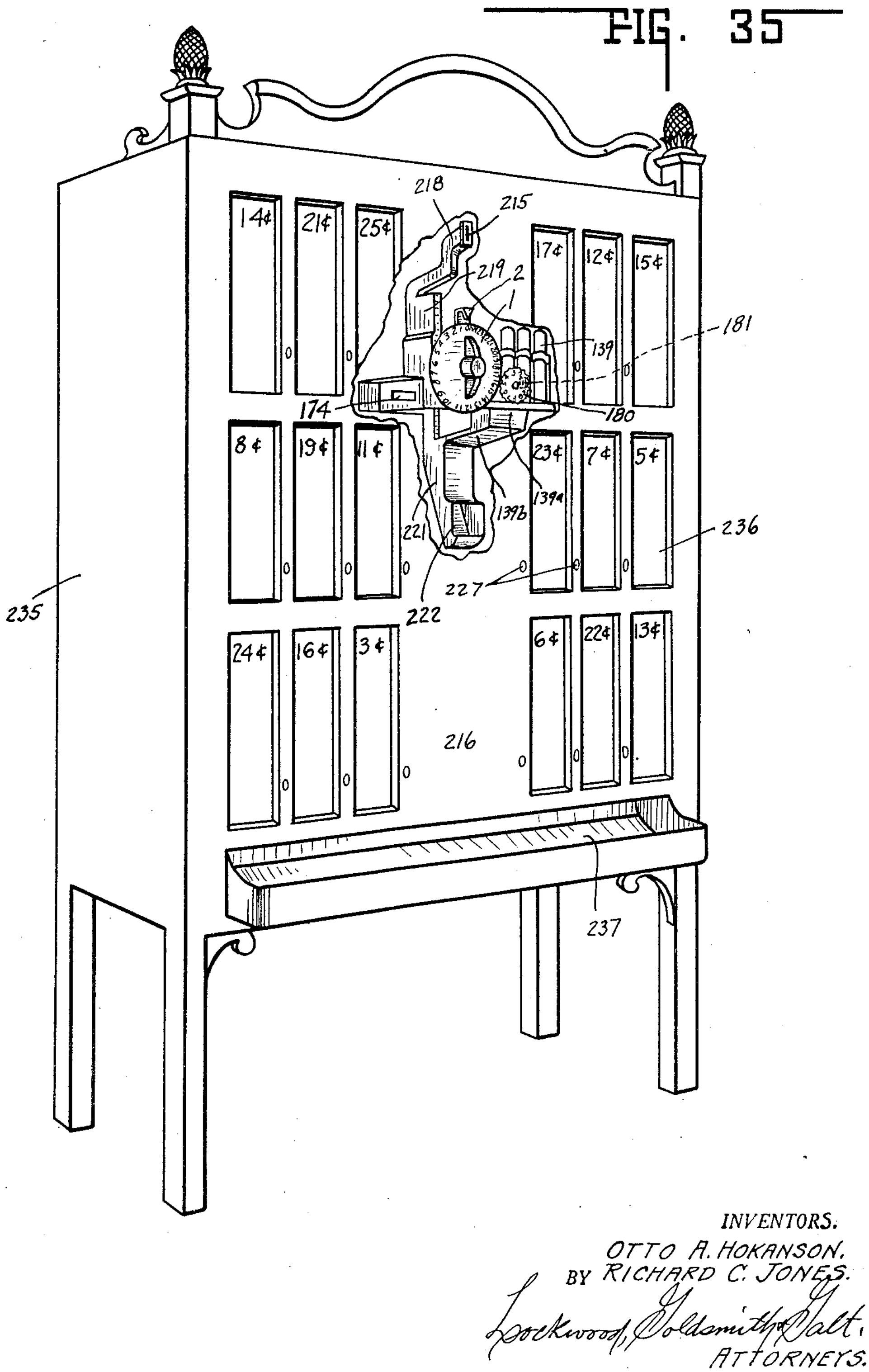
Fig. 35 is a perspective view illustrative of a vending machine cabinet with a portion broken away to show the multi-coin register and change maker mounted therein and shown in perspective.

The multi coin register and change maker is shown in Fig. 35 as mounted in the conventional vending machine cabinet 235 provided with a front panel 216 and having merchandise containers in different compartments viewable through their respective windows 236. Each merchandise compartment may carry merchandise of different values as indicated on said windows, being shown herein as ranging from three cents to twenty-five cents. Immediately below the windows there is a receiving trough 237 for the merchandise dispsensed from the compartments.

No invention is claimed herein with respect to the merchandise dispensing mechanism which may be of any well known character commonly employed in merchandise vending machines, other than the merchandise dispensing magnets 226 are selected by the operator according to the merchandise desired, through manual operation of the push buttons 227 associated with each of the compartments.

Supported by and within the cabinet the multi coin register and change maker is illustrated, wherein the setting dial 1, as more particularly illustrated in Figs. 1, 2, and 3, is exposed for manual manipulation exteriorly of the front panel of the cabinet, together with the pointer 2. Similarly, the coin slot 215, as illustrated more particularly in Fig. 32, is exposed through the front panel of the cabinet above the setting dial. Similarly the coin dispensing receptacle 222 is exposed for giving access to the change dispensed or the refund of coins deposited.

Also accessible through the front panel there is a window 181, for viewing the dial 180 setting up the amount of change to be dispensed, as more particularly illustrated in Figs. 28, 29. Opposite the window 181 there is a window 174 more particularly shown in Figs. 26 and 27, which discloses to the operator through the front panel 216 the availability of change in the change containing tubes 139. Thus, through the action of solenoid 167 the drop plate 170 is actuated to indicate whether or not there is change available.

In general operation, when the purchaser selects the article to be purchased from one of the windowed compartments 236, noting the price, he then moves the dial 1, setting it at the price of the article and places his coin or coins in the coin chute 215, said coin or coins being for the amount or greater than the amount of the purchase and the setting of the dial 1. He then pushes the button 227 which, if he has deposited a sufficient amount, releases the article which drops into the trough 237. If the amount deposited in the coin slot is greater than the price of the article, the change automatically is dispensed to him, dropping into the dispensing receptacle 222. If the deposit is insufficient to cover the price of the article selected by the push button 227, the article is not dispensed, but the money deposited then passes directly into the dispensing receptacle 222 for return. After depositing the coin and selecting the article, he may note the amount of change which is to be dispensed through the window 181 as designated by the number wheel 180. If the machine is out of change, he will be forewarned through the window 174, in which event the article will not be dispensed and his coin or coins returned to him unless he deposits the exact amount, such as will require no change. To permit of time for the coins to be sorted, the plate 210 closes so that he cannot insert a second coin until after the first coin deposited has been checked and acted upon.

Upon deposit of the coin in the coin slot 215, the plate 210 being in open position (Figs. 32, 33), the coin passes through the chute 218 and switch 206, closing said switch to energize the magnet 207 which then closes the plate 210 so that an additional coin cannot be inserted until after the first coin has been evaluated and passed one of the switches 205, whereupon the magnet 208 is energized to open the plate 210. The coins are then dropped into selector box 219, wherein they are separated as to denominations and actuate their respective switches 214. The coin thus actuates the particular one of the solenoids 76—78 (Fig. 10) which registers the value of the coin. However, should a slug be deposited, it will be separated from the good coins in the box 219, thrown out and returned to the purchaser through the chute 213.

After actuating their respective switches 214, the coins are temporarily held until all the coins have been deposited, whereupon the coins are directed to the coin box. For this purpose they drop into the receiving tray 194 (Figs. 30, 31, and 34) where they are held while the evaluating member is actuated through the respective energizing of said solenoids 76—78. If the evaluation is sufficient to meet the price of the article, the coins are dumped by the tray into the chute leading to the coin box. However, if the aggregate coins received in the tray do not reach the amount of the purchase, the coins will be dumped into the chute 221 for return to the purchaser. The tray is controlled through the magnets 189, 190 to dump the coins into one or the other chute through control of the evaluating member with respect to the price setting member controlled by the setting of the dial 1.

The dial 1 sets the price through manual manipulation of the shaft 21 which controls the contacts (Fig. 7) which in turn control the dispensing of the selected merchandise, said shaft at the same time positioning the ratchet wheel 42 according to said price. Ratchet 42 having been thus set, the evaluating member, in the form of the stop wheel 54, is set (Figs. 8–13) through the action of the solenoids 76—78 and their associated armatures and levers. Thus, it is necessary for operation that the evaluating member 54 be actuated by the aggregate value of the coins deposited to correspond at least with the value set manually through movement of the ratchet wheel 42. Otherwise, the tray 194 will be caused to dump the coin in the return chute instead of the coin box. But if the evaluating member has been moved by the coins to at least the value selected, then the tray is actuated to dump the coins into the chute leading to the coin box, which actuates the switch to permit discharge of the merchandise and additionally operates the change making mechanism if the coins deposited are greater than said price.

Wherein a greater amount of money has been deposited than that called for by the price of the merchandise, change will be dispensed by the change maker mechanism, as illustrated in Figs. 17–23. The monetary value credit on the transaction is established by the relative movement of the ratchet wheel 42 controlled by the price setting, and the ratchet wheel 54 comprising the evaluating member which has credited the transaction with the total amount of the deposit. This action is translated to the gear 105 (Fig. 12) which in turn translates the credit to the gear 109 (Figs. 1, 17). Gear 109 rotates the cams 112, 113 to position the slides 119, 119a through the cam followers 118, 118a. Said slides are, therefore, positioned in accordance with the credit established and the amount of change to be dispensed. In such established position, the lugs 120—124 and 120a—123a are positioned to cause a coin or group of coins to be discharged from one or more coin tubes 139. This action takes place when, after the lugs have been selectively positioned, the switch 133 is closed, energizing solenoid 132 which rocks the slides to make the lugs effective and cause the levers 137 to actuate the coin dispensing slides 138 to slide the lowermost coin or coins from the tube or tubes. Such dispensed change coins then drop into the chute 139b (Fig. 35) which communicates with chute 221 to deliver the change at 222.

The amount of change to be dispensed is indicated to the purchaser through the window 181 (Figs. 28, 29, 35) by the wheel 180 which is rotatably controlled by the gear 109 operating to establish the change making as above described.

In event that there are insufficient change making coins in the tubes 139 (Figs. 24–27), the segment 160 is permitted to swing to a position for closing a circuit operating solenoid 167 which throws the drop plate 70 into warning position. In this position notice is given to the purchaser through the window 174 (Figs. 26, 35) that there is no change available and that the exact amount of the purchase price must be deposited.

In summarizing the above, so far as the purchaser is concerned, after selecting the merchandise and noting the price, he sets the dial 1 at such price, pushes the merchandise release button 227, whereupon the merchandise will be released through closing of the circuit switches (Fig. 15) provided he has deposited enough coins to cause the evaluating member to register the amount or a greater amount. Any deposit short of this amount will be returned to the purchaser in the dispensing receptacle 222. If a greater amount is deposited than that called for by the setting of the dial, change will be similarly dispensed to the purchaser and the amount of such change will be noted through the window 181.

From the foregoing it will be recognized and understood that the invention described may be utilized in whole or in part for many purposes. For example, the coin register mechanism with the evaluating member may be employed to evaluate a plurality of coins of different denominations inserted in the register, either through a single slot or otherwise. Thus, as coins of different denominations are deposited in the machine, their aggregate value will be indicated by the position to which the evaluating member is moved. This feature of the invention, namely, the coin register, in association with that part of the invention which releases the change coins, may be utilized for making change. This is useful wherein upon deposit of one or more coins of the same or different denominations, and with the value setting member at zero, the deposited coins will be evaluated to their aggregate values and the equivalent value in change dispensed.

As more particularly described herein, the invention has been disclosed as applied to a vending machine for dispensing merchandise, and in the same manner it is applicable for operation of a coin controlled machine, such as an automatic phonograph, radio, or the like, dispensing service, time, or entertainment, as well as merchandise. The above comprises only a few of the possible applications of the different features of the invention.

The invention claimed is:

1. A change making device comprising a plurality of open bottom coin tubes, each tube containing a stack of coins of a given denomination, a discharge slide associated with each tube engageable with the bottommost coin therein to discharge it therefrom, a bottom plate movably associated with each tube for normally supporting the stack of coins, a wedging member having a cam surface cooperating with said plate movable to one position for raising said plate to stack supporting position and to another position for lowering said plate away from stack supporting position, an auxiliary support for the coins of said stack above the lowermost coin to be discharged from the tube, and mechanism operably connected with said wedging member, slide and auxiliary support for moving said support to stack supporting position and said wedging member to position for lowering said plate to thereby relieve the bottom coin from the weight of the stack during discharge thereof.

2. A coin dispensing device comprising an open bottom tube containing a stack of coins, a discharge slide associated with said tube movable thereunder to engage and discharge the bottommost coin therefrom, a bottom plate for normally supporting the stack of coins with the lowermost coin free of the bottom of said tube, a stack supporting member movable into and out of stack supporting position above the lowermost coin, means for raising and lowering said bottom plate relative to said tube, and mechanism operably connected with said means, slide and supporting member for movement to one position to support the stack, lower the plate to release the bottommost coin and actuate the slide to discharge it, and to another position for retracting the slide raising the plate and releasing the stack thereon.

3. A coin dispensing device comprising an open bottom tube containing a stack of coins, a discharge slide associated with said tube movable thereunder to engage and discharge the bottommost coin therefrom, a bottom plate for normally supporting the stack of coins with the lowermost coin free of the bottom of said tube, a stack supporting member movable into and out of stack supporting position above the lowermost coin, a sliding wedge slidable under said bottom plate for raising it to normal stack supporting position when extended thereunder and lowering it from normal stack supporting position when retracted, and lever mechanism operably connected with said wedge, stack supporting member and discharge slide for moving them to different relative positions, movement of said mechanism in one direction acting to move said member to stack supporting position, retract said wedge to plate lowering position and move said slide to coin discharge position, and movable in the reverse direction for retracting said slide, moving said member from stack supporting position and sliding said wedge under said plate to raise it to normal position for supporting said stack.

4. A change making device comprising a series of coin tubes, each tube containing a stack of coins of the same denomination, the coins in one tube differing in denomination from those in another tube, a discharge slide associated with each tube operable to discharge a coin therefrom upon actuation, an actuating lever operably connected with each slide, a change setting bar movable to different predetermined positions relative to said levers, each selected position thereof representing the total value of the change to be made, an actuating arm connected with said bar operable to rock it in its selected position to actuate a selected lever for coin discharge by its slide, a clamp movable by each lever into coin clamping position upon said lever being actuated for coin discharge to thereby support the coins above the lowermost coin, a wedging member movable relative to each of said tubes normally supporting the coins therein and retractable to permit the lowermost coin to be freed therefrom, and a lever operably connected with said first mentioned lever and said wedge member for simultaneously retracting said wedge member upon said clamp and discharge slide being moved in a direction for clamping said coins and discharging the lowermost coin freed from said tube.

5. A change making device comprising a series of coin tubes for containing pennies, an adjacent series of coin tubes for containing coins of higher denominations, a coin discharge member for each coin tube operable to discharge a coin therefrom upon actuation, a change setting bar associated with each series of tubes, an element operably associated with each of said bars for moving them independently of each other to different predetermined positions representing the total value of the change to be made, means for actuating said elements to cause the bar of the penny series of tubes to be first actuated to its position and the bar associated with the tubes containing coins of higher denominations to be thereafter actuated to its position in event the change to be made includes said higher denomination coins, and means for swinging said bars for operative engagement and actuation of the coin discharge members selected in accordance with the position of said bars for effecting discharge of selected coins from said tubes.

6. A change making device comprising a series of coin tubes, each tube containing a stack of coins of one denomination, the coins in one tube differing in denomination from those in another tube, a discharge slide associated with each tube operable to discharge a coin therefrom upon actuation, a rotatable wheel angularly displaceable in accordance with the total amount of change to be discharged, a cam rotatable with said wheel, a change setting bar movable by said cam to different predetermined positions, an actuating lever operably connected with each slide selectively engageable by said bar according to position, each selected position thereof representing the total value of the change to be made in accordance with the angular displacement of said wheel, and means operative to rock said bar in its selected position to actuate a selected lever for coin discharge by its slide.

7. A change making device comprising a series of coin tubes for containing pennies, an adjacent series of coin tubes for containing coins of higher denominations, a change setting bar associated with each series of tubes, a rotative control element angularly displaceable to a selected position for determining the total amount of change to be dispensed from both sets of said coin tubes, a pair of cams displaceable with said control element, each cam being operatively associated with one of said bars for thereby moving said bars relative to each other to different selected positions respectively, an actuating element operably connected with each of said bars for jointly moving them in their selected positions, and a coin discharge member for each coin tube selectively operable by one of said bars according to their respective selected positions for discharging the lowermost coin from a selected one of said tubes.

8. A change making device comprising a series of coin tubes for containing pennies, an adjacent series of coin tubes for containing coins of higher denominations, a coin discharge member for each coin tube operable to discharge a coin therefrom upon actuation, a change setting bar associated with each series of tubes, an element operably associated with each of said bars for moving them independently of each other to different predetermined positions representing the total value of the change to be made, means for swinging said bars for operative engagement and actuation of the coin discharge members selected in accordance with the position of said bars for effecting discharge of selected coins from said tubes, and a single displaceable change setting member movable to a predetermined position to establish the total change to be made, said member being operably connected with said elements for the selective positioning thereof.

OTTO A. HOKANSON.
RICHARD C. JONES.

REFERENCES CITED

The following references are of record in the file of this patent:

UNITED STATES PATENTS

| Number | Name | Date |
|---|---|---|
| 205,343 | Bliss | June 25, 1878 |
| 943,030 | Menchen | Dec. 14, 1909 |
| 1,063,590 | Potter | June 3, 1913 |
| 1,104,405 | Cairns | July 21, 1914 |
| 1,139,838 | Birkenbewel | May 18, 1915 |
| 1,582,659 | Baker | Apr. 27, 1926 |

FOREIGN PATENTS

| Number | Country | Date |
|---|---|---|
| 63,560 | Germany | of 1892 |